(12) United States Patent
Goto

(10) Patent No.: US 7,771,022 B2
(45) Date of Patent: Aug. 10, 2010

(54) METHOD OF SUPPLYING A LIQUID MATERIAL ONTO A BASE, A DROPLET EJECTION APPARATUS, A BASE WITH A PLURALITY OF COLOR ELEMENTS, AN ELECTRO-OPTIC APPARATUS AND AN ELECTRONIC APPARATUS

(75) Inventor: Tamotsu Goto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 502 days.

(21) Appl. No.: 11/181,940

(22) Filed: Jul. 15, 2005

(65) Prior Publication Data
US 2006/0017757 A1 Jan. 26, 2006

(30) Foreign Application Priority Data
Jul. 26, 2004 (JP) .............................. 2004-217876

(51) Int. Cl.
*B41J 2/04* (2006.01)
(52) U.S. Cl. .............................. 347/54; 347/57; 347/43
(58) Field of Classification Search .................... 347/54
See application file for complete search history.

(56) References Cited

U.S. PATENT DOCUMENTS

| | | | |
|---|---|---|---|
| 5,403,617 A | | 4/1995 | Haaland |
| 5,736,195 A | | 4/1998 | Haaland |
| 5,956,063 A | * | 9/1999 | Yokoi et al. ................. 347/107 |
| 6,312,096 B1 | * | 11/2001 | Koitabashi et al. ............ 347/40 |
| 6,517,175 B2 | * | 2/2003 | Kanaya et al. ................. 347/7 |
| 6,527,354 B2 | * | 3/2003 | Takahashi ..................... 347/9 |
| 6,540,326 B2 | * | 4/2003 | Matsubara et al. ............. 347/41 |
| 6,896,357 B2 | * | 5/2005 | Murakami et al. ............. 347/43 |
| 2002/0122086 A1 | * | 9/2002 | Matsubara et al. ............. 347/12 |

FOREIGN PATENT DOCUMENTS

| | | |
|---|---|---|
| JP | A-10-512190 | 11/1998 |
| JP | A 2001-133622 | 5/2001 |
| JP | A-2003-266669 | 9/2003 |
| JP | A-2003-266671 | 9/2003 |

* cited by examiner

*Primary Examiner*—Matthew Luu
*Assistant Examiner*—Brian J Goldberg
(74) *Attorney, Agent, or Firm*—Oliff & Berridge, PLC

(57) ABSTRACT

A method of supplying a liquid material in the form of droplets onto a base 10A includes the steps of: preparing a base 10A; forming a plurality of partitions 18R, 18G and 18B on the base 10A, each of the plurality of partitions 18R, 18G and 18B being adapted to become a color element; and ejecting one or more droplet via a droplet ejection device 103 while mutually moving the base 10A with respect to the droplet ejection device 103, the droplet ejection device 103 having one or more nozzle 118 through which the liquid material is supplied onto each of the plurality of partitions 18R, 18G and 18B. In the ejecting step, a first droplet is ejected onto a predetermined partition 18R, 18G and 18B of the base 10A through the nozzle 118 of the droplet ejection device 103 and one or more subsequent droplet is then ejected onto the predetermined partition 18R, 18G and 18B before the first droplet which has landed on the predetermined partition 18R, 18G and 18B becomes dry, and the total amount of each of the one or more subsequent droplet is less than the total amount of the first droplet.

12 Claims, 18 Drawing Sheets

METHOD OF SUPPLYING A LIQUID MATERIAL ONTO A BASE, A DROPLET EJECTION APPARATUS, A BASE WITH A PLURALITY OF COLOR ELEMENTS, AN ELECTRO-OPTIC APPARATUS AND AN ELECTRONIC APPARATUS

CROSS-REFERENCE TO RELATED APPLICATION

This application claims priority to Japanese Patent Application No. 2004-217876 filed Jul. 26, 2004, which is hereby expressly incorporated by reference herein in its entirety.

FIELD OF THE INVENTION

The present invention relates to a method of supplying a liquid material onto a base, a droplet ejection apparatus, a base with a plurality of color elements, an electro-optic apparatus and an electronic apparatus.

BACKGROUND OF THE INVENTION

A method of supplying a liquid material such as ink onto each partition of a base on which a plurality of partitions are formed using an ink jet apparatus is known. Each of the partitions is to be a pixel (color element). For example, a method of forming a filter element of a color filter substrate or emitting portions that are arranged in a matrix manner in a matrix type display using an ink jet apparatus is known. In such a method, since it is necessary that the ink droplet ejected to each partition (that is, each pixel) be evenly widened all over each of the partitions, a plurality of ink droplets may be applied to one partition (that is, one pixel). In this case, as a method of widening the ink over each pixel easily, Japanese Laid-open Patent Application No. 2001-133622 discloses a method in which a second ink droplet is ejected from an ink jet head to a predetermined partition before a first ink droplet that has been ejected becomes dry (that is, while the first ink droplet remains in the form of a liquid), whereby the first and second ink droplets are mixed in the form of a liquid each other.

However, in the method disclosed in this application, the second ink droplet easily spatters to any neighboring pixel for other color by means of impact that the second ink droplet collides with the first ink droplet that has been applied to one pixel previously. Therefore, there is a problem that color mixture of the first and second ink may occur.

SUMMARY OF THE INVENTION

It is therefore an object of the present invention to provide a method of supplying a liquid material onto a base, a droplet ejection apparatus, a base with a plurality of color elements, an electro-optic apparatus and an electronic apparatus, which can manufacture a high-quality base with a plurality of color elements that has no color mixture and missing color with high manufacturing efficiency.

In order to achieve the above object, in one aspect of the present invention, the present invention is directed to a method of supplying a liquid material onto a base. The method of supplying a liquid material in the form of droplets onto a base includes the steps of:

preparing a base;

forming a plurality of partitions on the base, each of the plurality of partitions being adapted to become a color element; and ejecting one or more droplet via a droplet ejection device while mutually moving the base with respect to the droplet ejection device, the droplet ejection device having one or more nozzle through which the liquid material is supplied onto each of the plurality of partitions.

In this case, in the ejecting step, a first droplet is ejected onto a predetermined partition of the base through the nozzle of the droplet ejection device and one or more subsequent droplet is then ejected onto the predetermined partition before the first droplet which has landed on the predetermined partition becomes dry, and the total amount of each of the one or more subsequent droplet is less than the total amount of the first droplet.

Thus, it is possible to supply a necessary quantity of liquid material to each partition to be a color element rapidly and surely in order to form the color elements on a base (or substrate). Further, it is possible to spread or widen the supplied liquid material all over each partition evenly. This makes it possible to prevent missing color from occurring surely. In addition, it is possible to restrain the liquid material from splashing when the subsequent droplet lands on the partition, and therefore it is possible to prevent a splash of the liquid material from reaching any neighboring partition effectively. This makes it possible to prevent color mixture from occurring surely. For this reason, it is possible to manufacture a high-quality base (or substrate) with a plurality of color elements with high manufacturing efficiency.

In the method of manufacturing a base with a plurality of color elements according to the present invention, it is preferable that in the ejecting step the droplet ejection device ejects the first and subsequent droplets so that the amount of one subsequent droplet is less than the amount of one first droplet.

Therefore, it is possible to prevent the liquid material from splashing on any neighboring partition when the subsequent droplet lands on the partition more surely, and this makes it possible to prevent color mixture from occurring more surely.

In the method of manufacturing a base with a plurality of color elements according to the present invention, it is preferable that the droplet ejection device includes: one or more cavity respectively communicating with the one or more nozzle; and a driving element which changes liquid pressure of the liquid material fulfilled within the cavity to eject a droplet on the basis of a driving signal having a driving voltage waveform and applied to the driving element. In this case, in the ejecting step, the amount of one droplet to be ejected is adjusted by changing the driving voltage waveform to be applied to the driving element.

This makes it possible to adjust the amount of one droplet more precisely.

In the method of manufacturing a base with a plurality of color elements according to the present invention, it is preferable that the one or more nozzle includes a plurality of nozzles, and that the ejecting step includes the steps of:

ejecting the first droplets onto one predetermined partition through some of the plurality of nozzles at a time; and ejecting the subsequent droplets onto the one predetermined partition through some of the plurality of nozzles that are less than the nozzles through which the first droplets have been ejected.

Therefore, it is possible to restrain the liquid material from splashing on any neighboring partition when the subsequent droplet lands on the partition, and this makes it possible to prevent color mixture from occurring surely.

In the method of manufacturing a base with a plurality of color elements according to the present invention, it is preferable that in the ejecting step the total amount of each of the one or more subsequent droplets is set to 30 to 70% of the total amount of the first droplet.

Therefore, it is possible to restrain the liquid material from splashing on any neighboring partition when the subsequent droplet lands on the partition, and this makes it possible to prevent color mixture from occurring surely. In addition, it is possible to improve the manufacturing efficiency further.

In the method of manufacturing a base with a plurality of color elements according to the present invention, it is preferable that in the ejecting step flying velocity of the subsequent droplet is set to be slower than flying velocity of the first droplet.

Therefore, it is possible to restrain the liquid material from splashing on any neighboring partition when the subsequent droplet lands on the partition, and this makes it possible to prevent color mixture from occurring surely.

In the method of manufacturing a base with a plurality of color elements according to the present invention, it is preferable that the one or more subsequent droplet includes a plurality of subsequent droplets, and in the ejecting step the subsequent droplet is ejected so that the position on which the subsequent droplet will land is different from the position on which the first and subsequent droplets have landed previously.

This makes it possible to spread or widen the supplied liquid material all over each partition more surely and more evenly.

In the method of manufacturing a base with a plurality of color elements according to the present invention, it is preferable that the droplet that has landed on the predetermined partition forms a dot initially, and in the ejecting step the subsequent droplet is ejected onto the predetermined partition so that a dot formed from the subsequent droplet partially overlaps with the dot formed from the droplet that has landed on the predetermined partition previously.

This makes it possible to spread or widen the supplied liquid material all over each partition more surely and more evenly.

In another aspect of the present invention, the present invention is directed to a droplet ejection apparatus for ejecting a droplet onto a base on which a plurality of partitions are formed. Each of the plurality of partitions is adapted to become a color element. The apparatus includes:

a droplet ejection device for ejecting a droplet onto the base, the droplet ejection device including one or more nozzle through which the droplet is to be ejected;

a moving device for mutually moving the base with respect to the droplet ejection device; and a control unit for controlling operation of the droplet ejection device and the moving device so that the droplet ejection device ejects droplets onto the base while mutually moving the base with respect to the droplet ejection device.

In this case, the control unit controls the droplet ejection device so that a first droplet is ejected onto a predetermined partition of the base through the nozzle of the droplet ejection device and one or more subsequent droplet is then ejected onto the predetermined partition before the first droplet which has landed on the predetermined partition becomes dry, and so that the amount of each of the one or more subsequent droplet is less than the amount of the first droplet.

Thus, it is possible to supply a necessary quantity of liquid material to each partition to be a color element rapidly and surely in order to form the color elements on a base (or substrate). Further, it is possible to spread or widen the supplied liquid material all over each partition evenly. This makes it possible to prevent missing color from occurring surely. In addition, it is possible to restrain the liquid material from splashing when the subsequent droplet lands on the partition, and therefore it is possible to prevent a splash of the liquid material from reaching any neighboring partition effectively. This makes it possible to prevent color mixture from occurring surely. For this reason, it is possible to manufacture a high-quality base (or substrate) with a plurality of color elements with high manufacturing efficiency.

In the droplet ejection apparatus according to the present invention, it is preferable that the droplet ejection device ejects the first and subsequent droplets so that the amount of one subsequent droplet is less than the amount of one first droplet.

In the droplet ejection apparatus according to the present invention, it is preferable that the droplet ejection device sets the amount of each of the one or more subsequent droplet to 30 to 70% of the total amount of the first droplet.

In the droplet ejection apparatus according to the present invention, it is preferable that the droplet ejection device includes: one or more cavity respectively communicating with the one or more nozzle; and a driving element which changes liquid pressure of the liquid material fulfilled within the cavity to eject a droplet on the basis of a driving signal having a driving voltage waveform and applied from the control unit to the driving element. In this case, the amount of one droplet to be ejected is adjusted by changing the driving voltage waveform to be applied to the driving element.

In the droplet ejection apparatus according to the present invention, it is preferable that the one or more nozzle includes a plurality of nozzles, and that the droplet ejection apparatus ejects first droplets onto one predetermined partition through some of the plurality of nozzles at a time, and then ejects subsequent droplets onto the one predetermined partition through some of the plurality of nozzles that are less than the nozzles through which the first droplets have been ejected.

In the droplet ejection apparatus according to the present invention, it is preferable that the control unit sets flying velocity of each of the one or more subsequent droplet so as to be slower than flying velocity of the first droplet.

In the droplet ejection apparatus according to the present invention, it is preferable that the moving device mutually moves the base with respect to the droplet ejection device so that the position on which the subsequent droplet will land is different from the position on which the first droplet has landed.

In the droplet ejection apparatus according to the present invention, it is preferable that the droplet that has been ejected by the droplet ejection device and landed on the predetermined partition forms a dot initially, and the droplet ejection device ejects the subsequent droplet onto the predetermined partition so that a dot formed from the subsequent droplet partially overlaps with the dot formed from the droplet that has landed on the predetermined partition previously.

In yet another aspect of the present invention, the present invention is directed to a base with a plurality of color elements. The base of the present invention is manufactured using the method described above.

In still another aspect of the present invention, the present invention is directed to an electro-optic apparatus. The electro-optic apparatus of the present invention includes the base with a plurality of color elements described above.

This makes it possible to provide an electro-optic apparatus provided with a high-quality base (or substrate) with a plurality of color elements with high manufacturing efficiency.

In yet another aspect of the present invention, the present invention is directed to an electronic apparatus. The electronic apparatus of the present invention includes the electro-optic apparatus described above.

This makes it possible to provide an electronic apparatus provided with the electro-optic apparatus of the present invention.

BRIEF DESCRIPTION OF THE DRAWINGS

The foregoing and other objects, features and advantages of the present invention will become more readily apparent from the following detailed description of preferred embodiments of the present invention which proceeds with reference to the accompanying drawings.

DETAILED DESCRIPTION OF THE INVENTION

Preferred embodiments of a method of supplying a liquid material onto a base, a droplet ejection apparatus, a base with a plurality of color elements, an electro-optic apparatus and an electronic apparatus will now be described in detail with reference to the appending drawings.

First Embodiment of Droplet Ejection Apparatus (Entire Construction of Droplet Ejection Apparatus)

Figure 1:
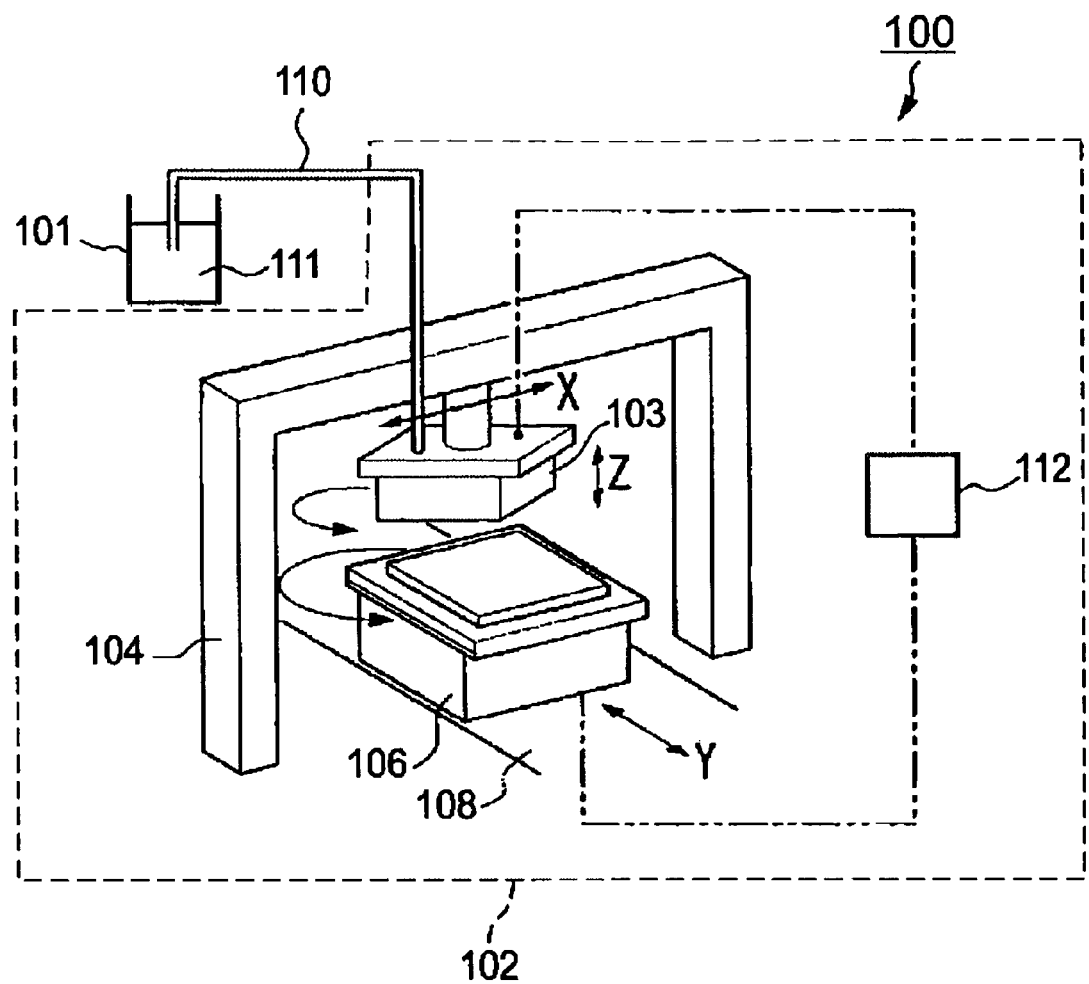
FIG. 1 is a perspective view of a droplet ejection apparatus in a first embodiment of the present invention.

FIG. 1 is a perspective view of a droplet ejection apparatus 100 in a first embodiment of the present invention. As shown in FIG. 1, the droplet ejection apparatus 100 includes a tank 101 for storing a liquid material 111, a tube 110, and an ejection scanning unit 102 in which the liquid material 111 is supplied from the tank 101 via the tube 110. The ejection scanning unit 102 is provided with a droplet ejection device 103 in which a plurality of droplet ejection heads 114 are mounted on a carriage 105, a first position control device 104 which controls the position of the droplet ejection device 103, a stage 106 for holding a base 10A (will be described later), a second position control device 108 which controls the position of the stage 106, and a control unit 112 for controlling the droplet ejection device 103, the first position control device 104 and the second position control device 108. A moving device is constituted from the first and second position control devices 104, 108. The tank 101 is connected to the plurality of droplet ejection heads 114 via the tube 110. The liquid material 111 is supplied to each of the plurality of droplet ejection heads 114 using compressed air.

The first position control device 104 moves the droplet ejection device 103 along an X axis direction and/or a Z axis direction perpendicular to the X axis direction in accordance with a signal from the control unit 112. Further, the first position control device 104 has a function of rotating the droplet ejection device 103 around an axis parallel to the Z axis. It is to be noted that in the present embodiment the Z axis direction is a direction parallel to a vertical direction (that is, a direction of gravitational acceleration). The second position control device 108 moves the stage 106 along a Y axis direction perpendicular to both the X and Z axis directions in accordance with a signal from the control unit 112. Further, the second position control device 108 has a function of rotating the stage 106 around an axis parallel to the Z axis.

The stage 106 has a plane parallel to both the X axis direction and the Y axis direction. Further, the stage 106 is constructed so that a base with a plurality of partitions to which the liquid material 111 is be supplied can be fixed or held on the stage 106.

As described above, the droplet ejection device 103 is moved to the X axis direction by means of the first position control device 104. On the other hand, the stage 106 is moved to the Y axis direction by means of the second position control device 108. Therefore, a mutual position of the droplet ejection heads 104 with respect to the stage 106 can be changed by the first position control device 104 and the second position control device 108.

The control unit 112 is constructed so as to receive ejection data from an outer information processing apparatus. The ejection data indicates mutual positions to which the liquid material 111 is to be ejected. In this regard, the detailed construction and function of the control unit 112 will be described later.

(Droplet Ejection Device)

Figure 2:
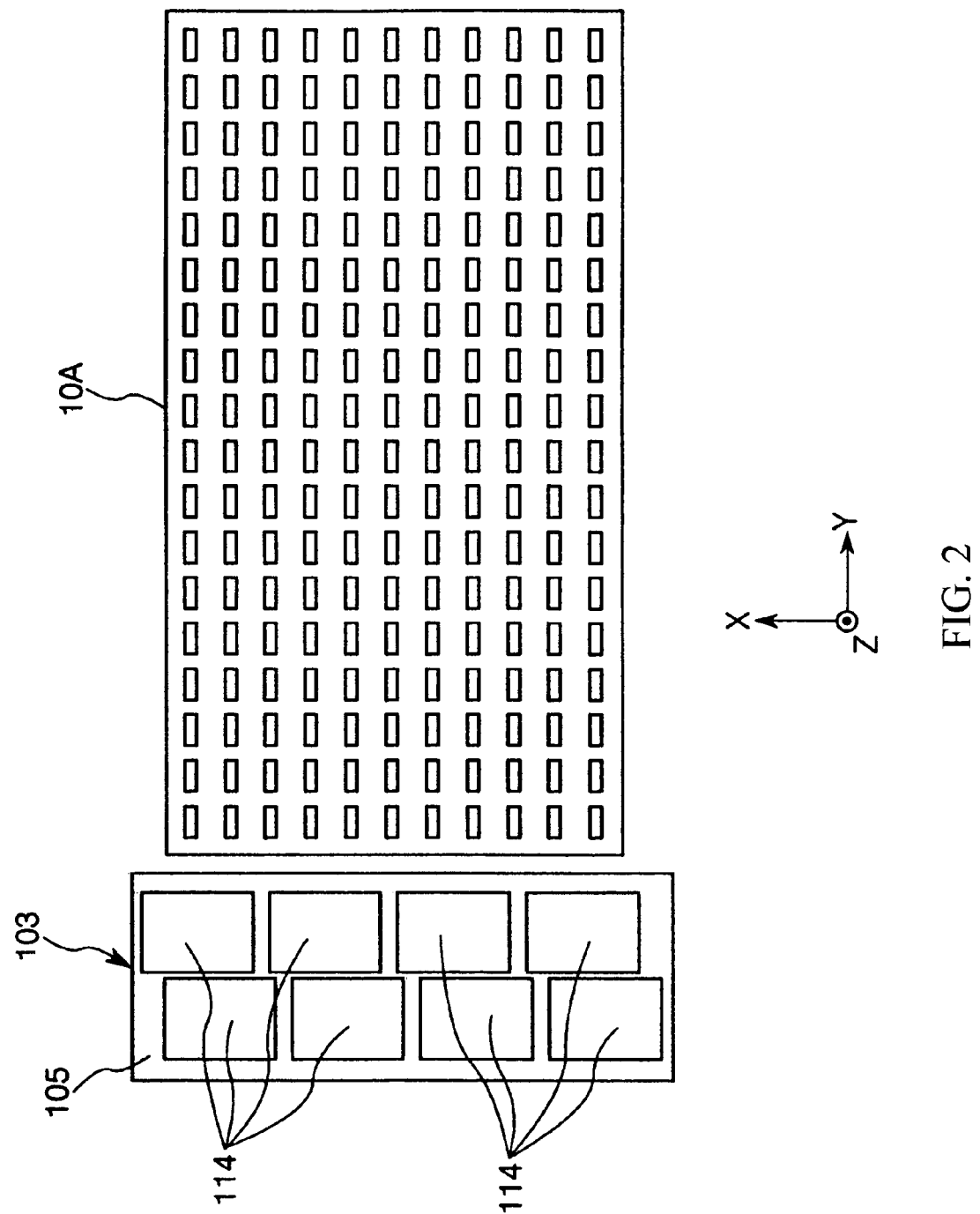
FIG. 2 is a view of the droplet ejection device when viewed from a stage side of the droplet ejection apparatus shown in FIG. 1.

FIG. 2 is a view of the droplet ejection device 103 when viewed from the stage 106 side of the droplet ejection apparatus 100 shown in FIG. 1. As shown in FIG. 2, the droplet ejection device 103 includes a plurality of droplet ejection heads 114 each having substantially the same structure, and the carriage 105 for holding these droplet ejection heads 114. In the present embodiment, the number of droplet ejection heads 114 included in the droplet ejection device 103 is eight. Each of the droplet ejection heads 114 has a bottom surface on which a plurality of nozzles 118 (described later) are provided. The shape of the bottom surface of each of the droplet ejection heads 114 is a polygon having two long sides and two short sides. The bottom surface of each of the droplet ejection heads 114 held in the droplet ejection device 103 faces the stage 106 side, and the long side direction and the short side direction of each droplet ejection head 114 are parallel to the X axis direction and the Y axis direction, respectively.

(Droplet Ejection Head)

Figure 3:
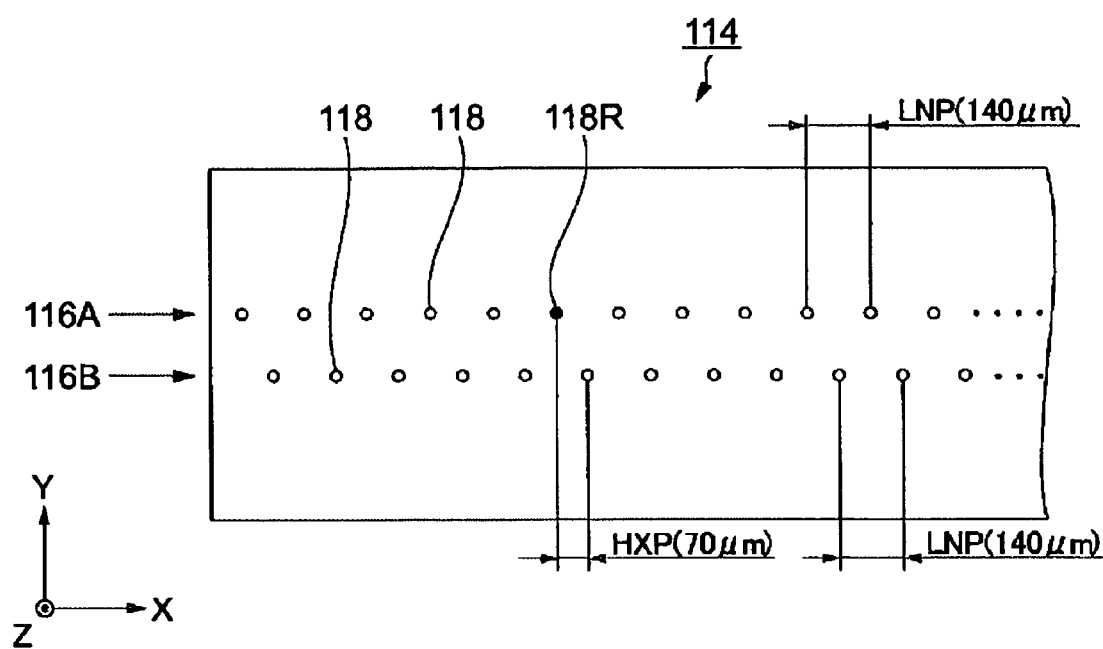
FIG. 3 is a drawing which shows a bottom surface of the droplet ejection head of the droplet ejection apparatus shown in FIG. 1.

FIG. 3 is a drawing which shows a bottom surface of the droplet ejection head 114 of the droplet ejection apparatus 100 shown in FIG. 1. The droplet ejection head 114 has a plurality of nozzles 118 arranged in the X axis direction. The plurality of nozzles 118 are arranged so that a nozzle pitch HXP of the droplet ejection head 114 in the X axis direction becomes about 70 μm. In this regard, the "nozzle pitch HXP of the droplet ejection head 114 in the X axis direction" corresponds to a pitch between adjacent nozzle images obtained by projecting all the nozzles 118 of the droplet ejection head 114 on the X axis along the Y axis direction.

In the present embodiment, the plurality of nozzles 118 in the droplet ejection head 114 constitute a nozzle line 116A and a nozzle ling 116B both of which extend in the X axis direction. The nozzle line 116A and the nozzle line 116B are arranged in a parallel manner so as to be spaced by a predetermined distance each other. In each of the nozzle lines 116A and 116B, ninety nozzles 118 are aligned in the X axis direction with a constant distance. In the present embodiment, the constant distance is about 140 μm. In other words, both a nozzle pitch LNP of the nozzle line 116A and a nozzle pitch LNP of the nozzle line 116B are about 140 μm.

The position of the nozzle line 116B is off to the positive direction of the X axis (that is, a right direction in FIG. 3) by a half length of the nozzle pitch LNP (that is, 70 μm) with respect to the position of the nozzle line 116A. For this reason, a nozzle pitch HXP of the droplet ejection head 114 in the X direction is half the nozzle pitch LNP of the nozzle line 116A or 116B (that is, 70 μm). Therefore, linear density of nozzles of the droplet ejection head 114 in the X axis direction is twice as much as linear density of nozzles of the nozzle line 116A or 116B. In this regard, the "linear density of nozzles in the X axis direction" corresponds to the number of nozzle images per unit length which is obtained by projecting the plurality of nozzles on the X axis along the Y axis direction.

It is to be noted that the number of nozzle lines included in the droplet ejection head 114 is not limited to two. The droplet ejection head 114 may include M lines of nozzle lines. In this case, "M" is a natural number of one or more. A plurality of nozzles 118 in each of the M nozzle lines are arranged with a pitch of M times length of the nozzle pitch HXP. Further, in the case where M is a natural number of two or more, with respect to one nozzle line among the M nozzle lines, the other (M-1) lines of nozzle lines are out to the X axis direction without overlapping by i times length of the nozzle pitch HXP. In this case, "i" is a natural number from 1 to M-1.

Since each of the nozzle lines 116A and 116B is constructed from 90 nozzles 118, each of the droplet ejection heads 114 has 180 nozzles 118. In this regard, each 5 nozzles of both ends of the nozzle line 116A are set to be "suspension nozzles". In the same way, each 5 nozzles of both ends of the nozzle line 116B are also set to be "suspension nozzles". No droplet of the liquid material 111 is ejected through these 20 suspension nozzles. Thus, each of 160 nozzles 118 among the 180 nozzles 118 in each of the droplet ejection heads 114 functions as a nozzle for ejecting the liquid material 111 in the form of droplets.

As shown in FIG. 2, the plurality of droplet ejection heads 114 are arranged in two lines along the X axis direction on the droplet ejection device 103. In consideration of the suspension nozzles, one line of the droplet ejection head 114 and the other line of the droplet ejection head 114 are arranged so that they partially overlap when viewed from the Y axis direction. Thus, the droplet ejection device 103 is constructed so that the nozzles 118 for ejecting the liquid material 111 continues in the X axis direction with the nozzle pitch HXP over the length of a short side of the base 10A. Although the droplet ejection heads 114 are provided so as to cover the entire short side of the base 10A (the length of the base 10A in the X axis direction) in the droplet ejection device 103 of the present embodiment, the droplet ejection device in the present invention may cover a part of the short side of the base 10A.

Figure 4:
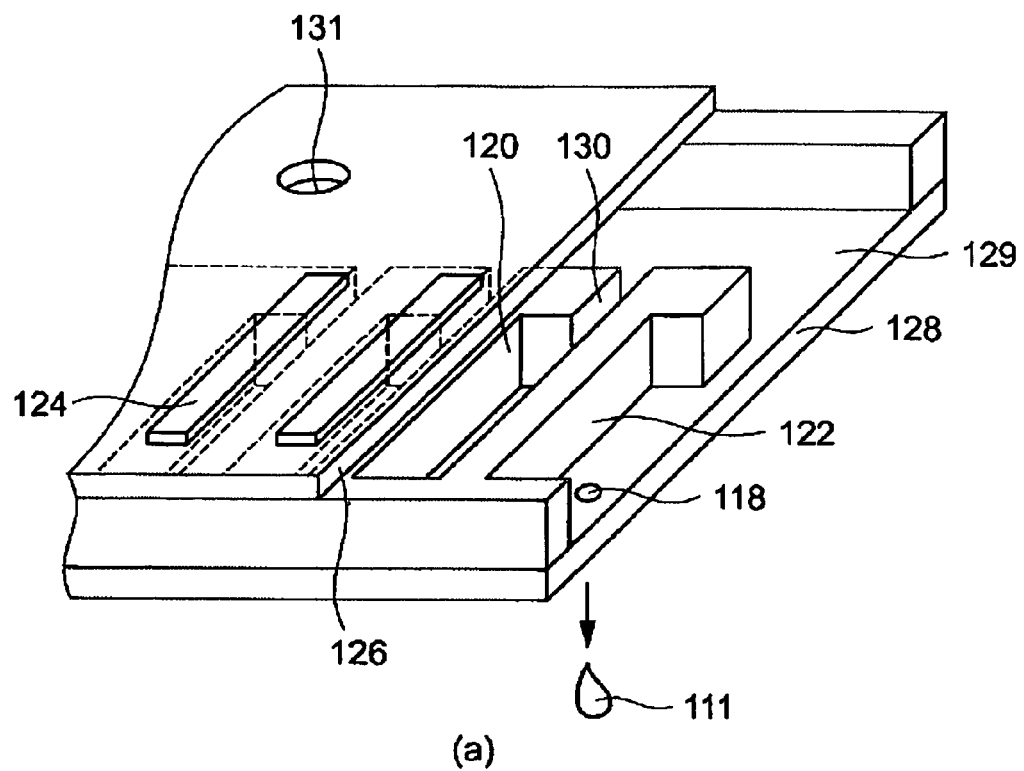
FIGS. 4(a) and 4(b) are respectively a perspective cross-sectional view and a cross sectional view of the droplet ejection head of the droplet ejection apparatus shown in FIG. 1.
Figure 4:
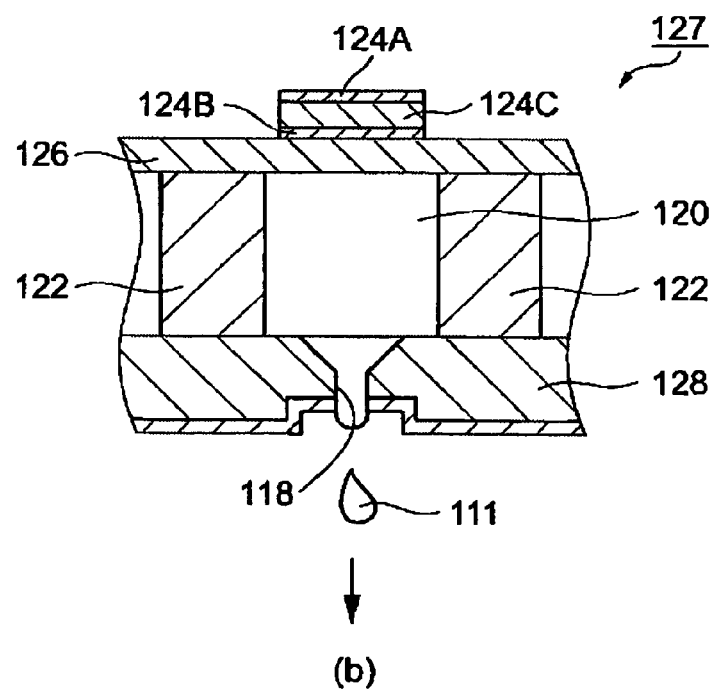

FIGS. 4(a) and 4(b) are respectively a perspective cross-sectional view and a cross sectional view of the droplet ejection head 114 of the droplet ejection apparatus 100 shown in FIG. 1. As shown in FIGS. 4(a) and 4(b), each of the droplet ejection heads 114 constitutes an ink jet head. More specifically, each droplet ejection head 114 is provided with a diaphragm plate 126 and a nozzle plate 128. A reservoir 129 is positioned between the diaphragm plate 126 and the nozzle plate 128. The reservoir 129 fulfills with the liquid material 111 supplied from the tank 101 via an ink intake port 131.

A plurality of dividing walls 122 are positioned between the diaphragm plate 126 and the nozzle plate 128. A cavity 120 is defined by the diaphragm plate 126, the nozzle plate 128 and a pair of dividing walls 122. Since the cavity 120 is provided in accordance with one nozzle 118, the number of cavities 120 is the same as the number of nozzles 118. The liquid material 111 is supplied to the cavity 120 via an ink supply port 130 provided between the pair of dividing walls 122.

A vibrator 124 as a driving element is positioned on the diaphragm plate 126 in accordance with each of the cavities 120. The vibrator 124 changes liquid pressure of the liquid material 111 fulfilled within the cavity 120, and includes a piezoelectric element 124C, and a pair of electrodes 124A and 124B between which the piezoelectric element 124C is sandwiched. By applying a driving voltage signal between the pair of electrodes 124A and 124B, the piezoelectric element 124C deforms to change the liquid pressure of the liquid material 111 fulfilled within the cavity 120, thereby ejecting the liquid material 111 in the form of droplets through the corresponding nozzle 118. The shape of each of the nozzles 118 is adjusted so that the liquid material 111 is ejected in the Z axis direction through each nozzle 118.

In this regard, the "liquid material" means a material having enough degree of viscosity to be ejected through the nozzle 118. In this case, the material may be either water-based or oil-based. The material needs only have ejectable fluidity (degree of viscosity) through the nozzle 118. Even though a solid material may be dispersed into the material, the material may be fluid as a whole.

The control unit 112 shown in FIG. 1 may be constructed to apply a driving voltage signal to each of the plurality of vibrators 124 independently from each other. In other words, a volume of the liquid material 111 to be ejected through each of the nozzles 118 may be controlled in accordance with the driving voltage signal from the control unit 112 with reference to each nozzle 118. In this case, the control unit 112 may changeably set the volume of the liquid material 111 to be ejected through each of the nozzles 118 from 0 pl to 42 pl (pico liter). Further, the control unit 112 may set each of the nozzles 118 either to carry out an ejection operation during a scanning operation or not to carry out it.

In the present specification, a portion including one nozzle 118, one cavity 120 corresponding to the one nozzle 118, and one vibrator 124 corresponding to the one cavity 120 will be referred to as "ejecting portion 127". In this case, one droplet ejection head 114 has the same number of ejecting portions 127 as the number of nozzles 118. The ejecting portion 127 may have a structure in which the liquid material is ejected using thermal expansion of the liquid material (film boiling) by means of an electro-thermal converting element.

In the present invention, the nozzle pitch HXP in the droplet ejection device 103 is not limited to that described above, and it may have any size. Further, in addition to the structure shown in FIG. 2, the droplet ejection device 103 may be constructed so that a plurality of droplet ejection heads 114 are overlapped in the Y axis direction. In this case, it is possible to shorten the nozzle pitch (nozzle linear density) of the whole droplet ejection device 103 in the X direction, and this makes it possible to supply droplets onto the base 10A with higher resolution.

(Control Unit)

Figure 5:
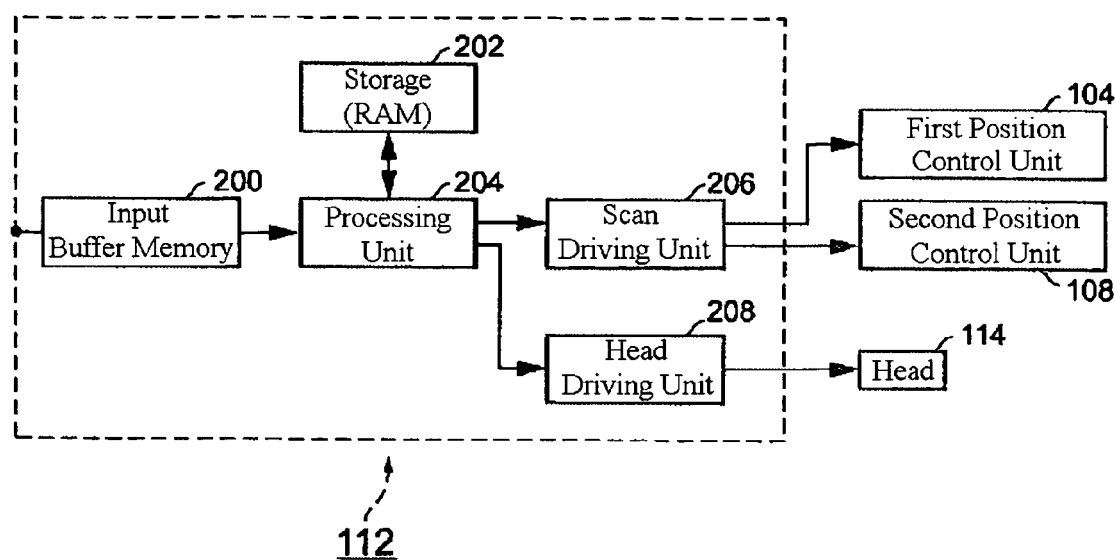
FIG. 5 is a block diagram of a control unit of the droplet ejection apparatus shown in FIG. 1.

Next, the configuration of the control unit 112 will be now described. FIG. 5 is a block diagram of the control unit 112 of the droplet ejection apparatus 100 shown in FIG. 1. As shown in FIG. 5, the control unit 112 is provided with an input buffer memory 200, a storage unit 202, a processing unit 204, scan driving unit 206, and head driving unit 208. The processing unit 204 is electrically connected to each of the input buffer memory 200, the storage unit 202, the scan driving unit 206, and the head driving unit 208. Further, the scan driving unit 206 is electrically connected to both the first position control unit 104 and the second position control unit 108. Similarly, the head driving unit 208 is electrically connected to each of the plurality of droplet ejection heads 114.

The input buffer memory 200 receives ejection data for ejection of droplets of the liquid material 111 from an outer information processing apparatus. The ejection data includes data for indicating a mutual position of each of the nozzle 118 with respect to each of all partitions on the base, data for indicating the number of times of mutual scanning required to supply the liquid material 111 to all the partitions until a thickness of the supplied liquid material become a desired thickness, data for specifying some nozzles 118 as ON nozzles 118A, and data for specifying the other nozzles 118 as OFF nozzles 118B. The input buffer memory 200 outputs the ejection data to the processing unit 204, and the processing unit 204 then stores the ejection data in the storage unit 202. In this regard, the storage unit 202 in FIG. 5 is RAM (Random Access Memory).

The processing unit 204 outputs the data for indicating a mutual position of each of the nozzles 118 with respect to each of all partitions on the base to the scan driving unit 206 on the basis of the ejection data stored in the storage unit 202.

The scan driving unit 206 respectively outputs driving voltage signals in accordance with the mutual position data and ejection cycle EP (described later with reference to FIG. 6) to the first position control unit 104 and the second position control unit 108. As a result, the droplet ejection heads 114 (that is, droplet ejection device 103) mutually scan the partitions. On the other hand, the processing unit 204 outputs a selection signal SC for specifying ON/OFF of each of the nozzles 118 in each ejection timing to the head driving unit 208 on the basis of the ejection data stored in the storage unit 202 and the ejection cycle EP. The head driving unit 208 then outputs an ejection signal required to eject the liquid material 111 to the droplet ejection head 114 on the basis of the selection signal SC. As a result, the liquid material 111 is ejected in the form of droplets through the corresponding nozzles 118 in the droplet ejection head 114.

The control unit 112 may be a computer provided with a CPU (central processing unit), a ROM (read only memory), a RAM and the like. In this case, the operation of the control unit 112 described above may be realized using software program that the computer can carry out. Alternatively, the control unit 112 may be realized with a dedicated circuit (that is, hardware).

Figure 6:
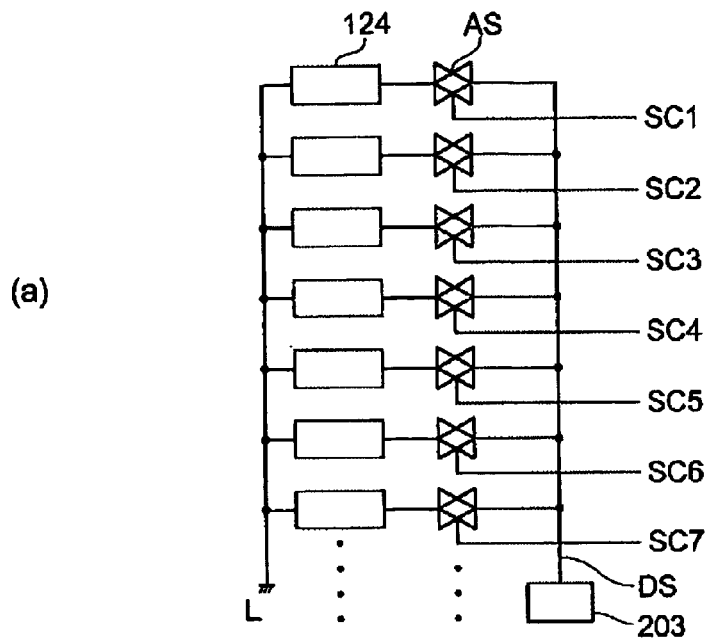
FIG. 6(a) is a schematic view of a head driving unit.
FIG. 6(b) is a timing chart which shows a driving signal, a selecting signal and an ejecting signal for the head driving unit.
Figure 6:
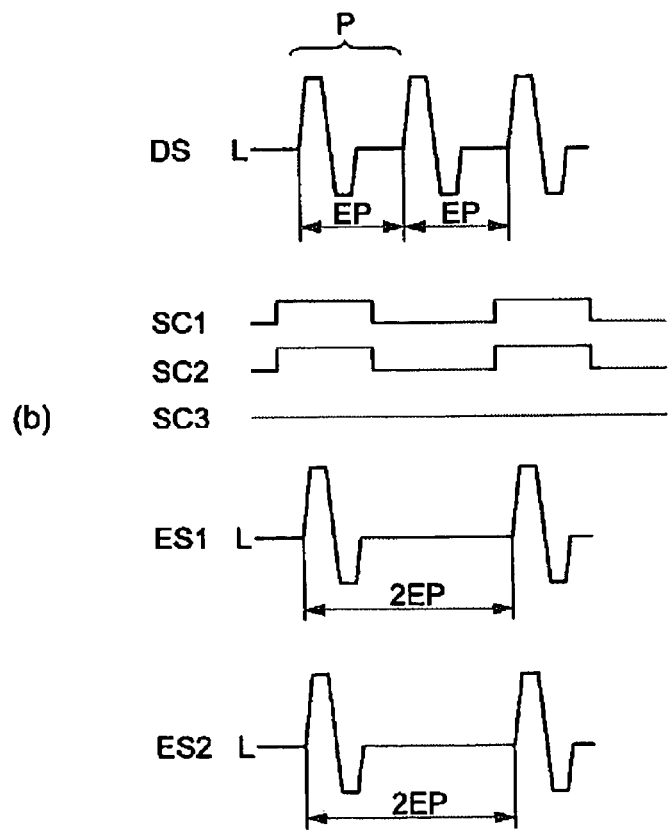

Next, the configuration and function of the head driving unit 208 in the control unit 112 will be described. FIG. 6(*a*) is a schematic view of the head driving unit 208. FIG. 6(*b*) is a timing chart which shows a driving signal, a selecting signal and an ejecting signal for the head driving unit. 208. As shown in FIG. 6(*a*), the head driving unit 208 includes one driving signal generator 203, and a plurality of analog switches AS. As shown in FIG. 6(*b*), the driving signal generator 203 generates a driving signal DS. Potential of the driving signal DS is temporally changed with respect to a reference potential L. More specifically, the driving signal DS includes a plurality of ejection waveform P that repeats with the ejection cycle EP. In this regard, the ejection waveform P corresponds to a driving voltage waveform to be applied between the pair of electrodes 124A and 124B in the corresponding vibrator 124 in order to eject one droplet through one nozzle 118.

The driving signal DS is supplied to an input terminal of each of the analog switches AS. Each of the analog switches AS is provided in accordance with each of the ejection portions 127. Namely, the number of analog switches AS is the same as the number of ejection portions 127 (that is, the number of nozzles 118).

The processing unit 204 outputs the selection signal SC for indicating ON/OFF of each of the nozzles 118 to each of the analog switches AS. In this regard, the selection signal SC can become either a high level state or a low level state with respect to each of the analog switches AS. In response to the driving signal DS and the selection signal SC, each of the analog switches AS applies an ejection signal ES to the electrode 124A of the corresponding vibrator 124. More specifically, in the case where the selection signal becomes the high level state, the analog switch AS is turned ON, and applies the driving signal DS as the ejection signal ES to the electrode 124A. On the other hand, in the case where the selection signal becomes the low level state, the analog switch AS is turned OFF, and the potential of the ejection signal ES that the analog switch AS outputs to the electrode 124A becomes a reference potential L. When the driving signal DS is applied to the electrode 124A of the vibrator 124, the liquid material 111 is ejected through the nozzle 118 that corresponds to thee vibrator 124. In this regard, the reference potential L is applied to the electrode 124B of each of the vibrators 124.

In an example shown in FIG. 6(*a*), a high level period and a low level period of each of two selection signal SC are set so that the ejection waveform P appears with a cycle 2EP that is twice the ejection cycle EP in each of two ejection signal ES. Thus, the liquid material 111 is ejected in the form of droplets through each of the two corresponding nozzles 118 with the cycle 2EP. A common driving signal DS is applied to each of the vibrators 124 that correspond to the two nozzles 118 from a shared driving signal generator 203. For this reason, the liquid material 111 is ejected through the two nozzles 118 at substantially same timing.

By using the configuration described above, the droplet ejection apparatus 100 carries out an ejection scanning operation in which the liquid material 111 is supplied to the base 10A in accordance with the ejection data applied to the control unit 112.

Embodiment of Method of Supplying Liquid Material

A method of supplying a liquid material in the form of droplets onto a base according to the present invention is carried out using the droplet ejection apparatus 100 described above. Hereinafter, an embodiment of the method of the present invention will be described with reference to FIGS. 7 to 10. In this regard, although the case of manufacturing a color filter substrate used for a liquid crystal display is assumed in the following explanation, the present invention can be applied to manufacturing of various electro-optic apparatuses other than the color filter substrate as will be described later.

Figure 7:
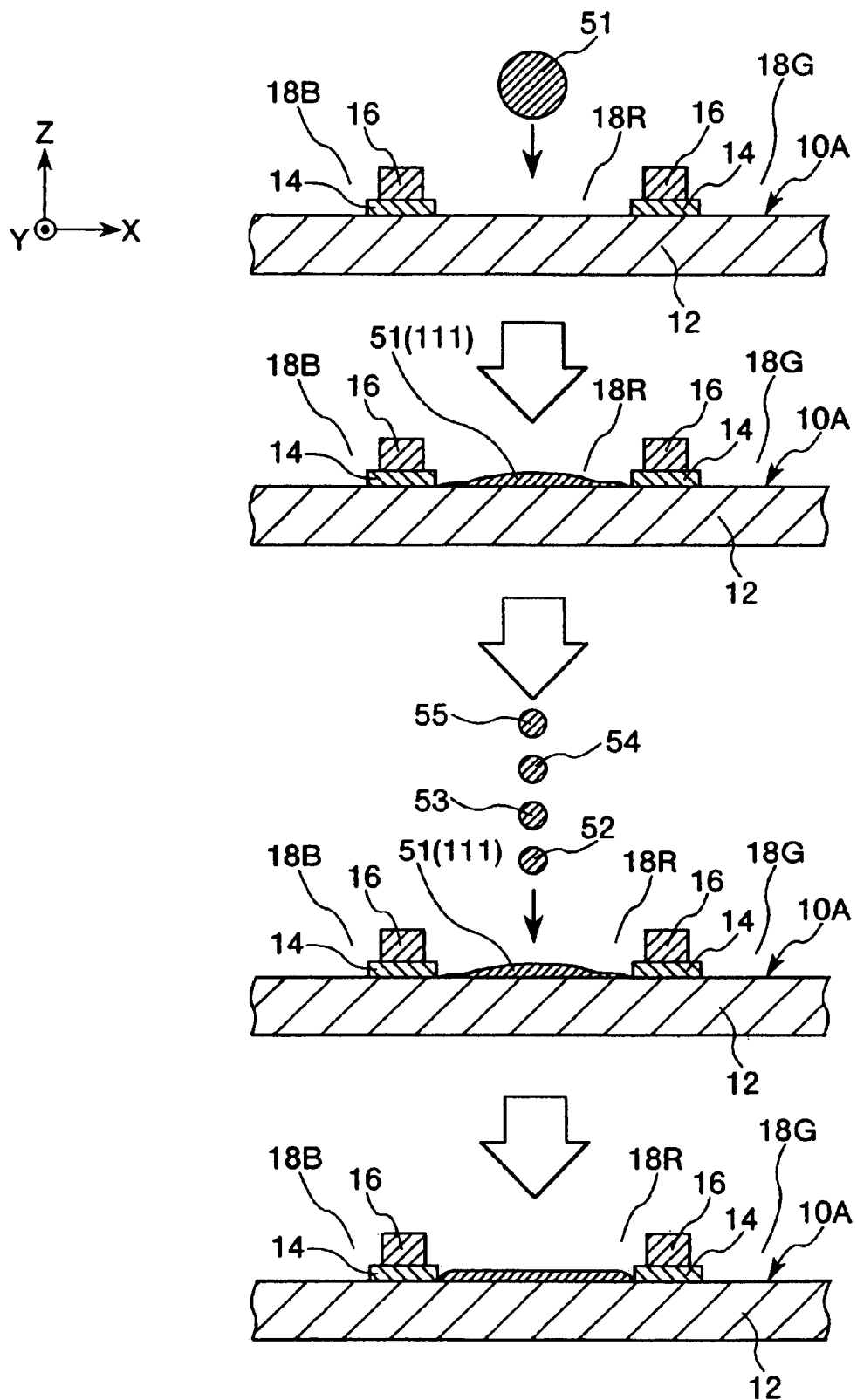
FIG. 7 is a drawing for explaining a droplet supplying method in the first embodiment of the present invention.

As shown in FIG. 7, a plurality of elongated partitions 18R, 18G and 18B each becoming a color element (pixel) are formed on a base 10A so as to be separated with black matrices 14 and banks 16. The partition 18R is a region to become a color element of R (red), the partition 18G is a region to become a color element of G (green), and the partition 18B is a region to become a color element of B (blue).

Each of the partitions 18R, 18G and 18B has a substantially rectangular shape. The longitudinal direction of each partition is parallel to a Y axis direction, while the lateral direction of each partition is parallel to an X axis direction. A set of partitions 18R, 18G and 18B provided in a linear manner corresponds to one pixel of the color filter substrate. Many sets of partitions 18R, 18G and 18B are formed on the base 10A so as to be arranged in a matrix manner. Namely, the base 10A is used for manufacturing a stripe-arrangement type color filter substrate.

The droplet ejection apparatus 100 carries out one or more ejection scanning operation in which a liquid material 111 for forming color elements is ejected in the form of droplets through the nozzle 118 while mutually moving the base 10A with respect to the droplet ejection device 103 in the Y axis direction by driving the second position control device 108. In the ejection scanning operation, the droplet ejection device 103 and the base 10A are mutually moved so that the droplet ejection device 103 moves all over the base 10A as a rule.

In this regard, although the case of supplying droplets onto the partition 18R will be described as a representative example in the following explanation, droplets can be supplied onto the partition 18G or 18B in the same manner. Further, although FIG. 7 shows only one partition 18R, droplets can be supplied onto all the partitions 18R above which the droplet ejection head 114 passes in one ejection scanning operation in the same manner.

In the method of supplying droplets onto the base according to the present invention, a first droplet of the liquid material 111 is ejected onto the partition 18R through the nozzle 118. In this case, a plurality of first droplets may be ejected. One or more subsequent droplet is then ejected onto the same partition 18R once or a plurality of times before the first droplet (liquid material 111) which has landed on the partition 18R becomes dry (that is, the first droplet remains in a liquid state).

In the present invention, since the first and subsequent droplets thus supplied onto one partition 18R are combined as they are in a liquid state, the liquid material 111 can be evenly widened all over the partition 18R. This makes it possible to prevent missing color from occurring surely.

Further, the present invention is characterized that the total amount of first droplet is less than the total amount of each of one or more subsequent droplets. Thus, the present invention has following advantages.

When the one or more subsequent droplet lands on the partition 18R, the first droplet (liquid material 111) is already supplied onto the partition 18R. Thus, in the case where impact of the subsequent droplet when landing on the partition 18R is great, the landed first droplet, that is, the red liquid material 111 may splash as a spray on the neighboring green partition 18G or blue partition 18B. Thus, color mixture occurs to change the color of the partition, and this results in low quality of a color filter substrate.

Compared with the case described above, in the present invention, it is possible to reduce the impact of the subsequent droplet when landing on the partition because the amount of subsequent droplet is reduced (that is, the size of the subsequent droplet is set to be small. This makes it possible to prevent the landed first droplet (liquid material 111) from splashing as a spray. Even if the liquid material 111 splashes as a spray, it is possible to prevent the spray from reaching the neighboring partition 18G or 18B effectively. Therefore, it is possible to prevent color mixture as described above from occurring effectively.

Further, since the total amount of first droplet is set to be relatively more than that of subsequent droplet, it is possible to reduce the number of droplets required to supply necessary quantity of the liquid material 111 onto the partition 18R. This makes it possible to form a pixel quickly. Therefore, it is possible to improve manufacturing efficiency of the color filter substrate.

On the other hand, in the case where all of the first and subsequent droplets are reduced in quantity, it is possible to prevent color mixture, but the number of droplets required to supply necessary quantity of the liquid material 111 onto the partition 18R tends to increase. This makes the manufacturing efficiency be lowered. In the present invention, it is preferable that the total amount of each of the one or more subsequent droplets is set to 30 to 70% of the total amount of the first droplet in consideration to achieve high-level balance between an effect of preventing color mixture and an effect of improving the manufacturing efficiency.

Figure 8:
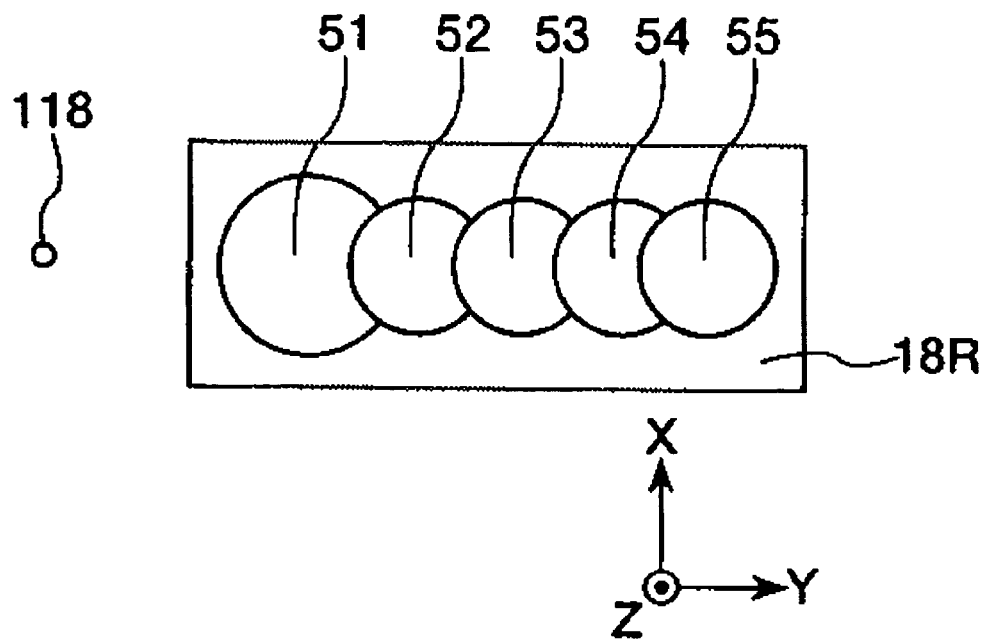
FIG. 8 is a drawing for explaining a droplet supplying method in the first embodiment of the present invention.

Hereinafter, the method of supplying a liquid material will be described more specifically with reference to the accompanying drawings. FIGS. 7 and 8 are drawings for explaining a droplet supplying method (method of supplying a liquid material) in the first embodiment of the present invention.

In the first embodiment shown in FIGS. 7 and 8, one first droplet 51 is ejected through one nozzle 118. Four subsequent droplets 52, 53, 54 and 55 are then ejected through the same nozzle 118 in turn. As shown in FIG. 7, the amount of each of the four subsequent droplets 52, 53, 54 and 55 is adjusted so as to be less than the amount of first droplet 51.

It is possible to adjust the amount of droplet to be ejected through the nozzle 118 by changing the shape of a driving voltage waveform (see FIG. 6) to be applied to the vibrator 124. Although the amount of each of the four subsequent droplets 52, 53, 54 and 55 is the same each other in the example shown in FIGS. 7 and 8, it may be different from each other. In this case, it has only to be less than the amount of first droplet 51.

Further, in the present invention, it is preferable that flying velocity (that is, ejection speed) of each of the subsequent droplets 52, 53, 54 and 55 is set to be slower than flying velocity of the first droplet 51. This makes it possible to further reduce the impact of each of the subsequent droplets 52, 53, 54 and 55 when landing on the partition. Therefore, it is possible to prevent the liquid material 111 from splashing more surely. In this regard, it is possible to adjust the flying velocity of each of the first and subsequent droplets 51, 52, 53, 54 and 55 by changing the shape of the driving voltage waveform to be applied to the vibrator 124.

Moreover, in the present embodiment, the first droplet 51 and the subsequent droplets 52, 53, 54 and 55 are in turn ejected through the one nozzle 118 while mutually moving the base 10A in the Y axis direction with respect to the nozzle 118. Thus, as shown in FIG. 8, it is possible to shift the landing positions of the first droplet 51 and the subsequent droplets 52, 53, 54 and 55 bit by bit. This makes it possible to spread the liquid material 111 all over the partition 18R more evenly.

Further, a plurality of dots formed when the first droplet 51 and the subsequent droplets 52, 53, 54 and 55 land on the partition 18R align along the Y axis direction (that is, scanning direction). As shown in FIG. 8, it is preferable that the first and subsequent droplets are supplied onto the partition so that these dots partially overlap with each other by a predetermined space. In this regard, the "predetermined space" means a space so that each of the first and subsequent droplets links with each other in the case where it is assumed that they exist independently without combining one dot formed from the droplet that has landed on the partition 18R previously with other droplet.

The diameter of the dot formed from one droplet of the liquid material 111 that has been ejected through the nozzle 118 and landed on the partition 18R may change on the basis of the volume of the one droplet of the liquid material 111, contact angle (wettability) of the liquid material 111 against the bottom surface of the partition 18R, and the like. For this reason, by examining the diameter of the dot formed from one droplet of the liquid material 111 that has landed on the partition 18R with experimentation or theoretical calculation in advance, it is possible to control the "predetermined space" described above.

In this regard, although the dots formed from the first droplet 51 and the subsequent droplets 52, 53, 54 and 55 that have landed on the partition are described so as to partially overlap in FIG. 8, it should be understood that the plurality of droplets are integrated with each other and spread peripherally in fact. Namely, FIG. 8 is a schematic view so that it is easy to understand the method of supplying droplets according to the present invention, and does not indicate actual spreading manner of the liquid material 111 supplied onto the partition 18R (the same in FIGS. 9 and 10).

In this regard, the first droplet 51 and the subsequent droplets 52, 53, 54 and 55 may not be ejected by one ejection scanning operation, and they may be ejected by a plurality of ejection scanning operations if the liquid material 111 that has been supplied on the partition previously does not become dry.

Further, in the present invention, by repeating the steps of: supplying the liquid material 111 onto the partition 18R; and drying (pre-baking) the supplied liquid material 111 with a drying apparatus, a color element material may be formed in a stacked manner. In this case, in the present invention, when droplets of the liquid material 111 are again ejected onto the partition 18R after drying, the relation between the first droplet and the subsequent droplets described above is applied after returning to the starting point. A droplet ejected onto the partition 18R first after drying corresponds to the first droplet.

Figure 9:
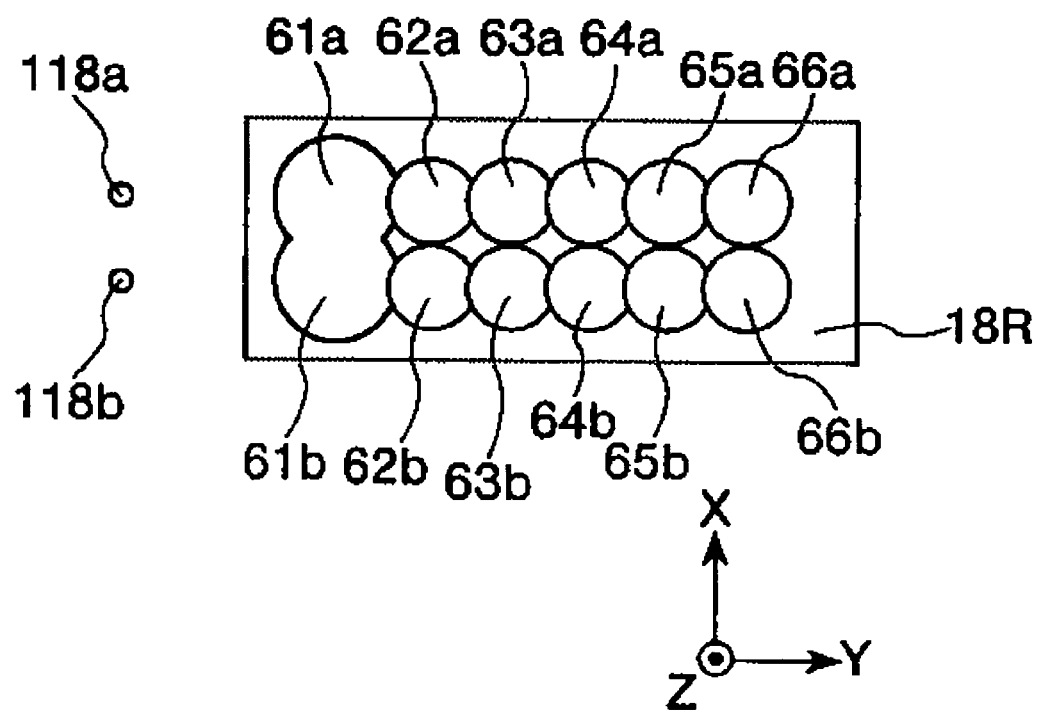
FIG. 9 is a drawing for explaining a droplet supplying method in a second embodiment of the present invention.

FIG. 9 is a drawing for explaining a droplet supplying method in a second embodiment of the present invention. Hereinafter, an explanation will be given for the method of supplying droplets onto a base of the second embodiment with reference to FIG. 9; however, differences between the first embodiment described above and the second embodiment are chiefly described, and the description of the similar portions is omitted.

In the second embodiment shown in FIG. 9, two first droplets 61a, 61b are ejected onto one partition 18R through two nozzles 118a, 118b at a time. Two subsequent droplets are then ejected onto the one partition 18R through the two nozzles 118a, 118b five times. Namely, subsequent droplets include first subsequent droplets 62a, 62b, second subsequent droplets 63a, 63b, third subsequent droplets 64a, 64b, fourth subsequent droplets 65a, 65b, and fifth subsequent droplets 66a, 66b. The amount of each of the subsequent droplets 62a, 62b, 63a, 63b, 64a, 64b, 65a, 65b, 66a and 66b is adjusted so as to be less than the amount of each of the first droplets 61a, 61b.

Further, in the similar manner to the first embodiment described above, the first and subsequent droplets are supplied onto the one partition 18R so that these dots partially overlap with each other by a predetermined space. According to the method of supplying droplets onto the base in the second embodiment, it is possible to obtain the effects similar to those in the first embodiment described above.

Figure 10:
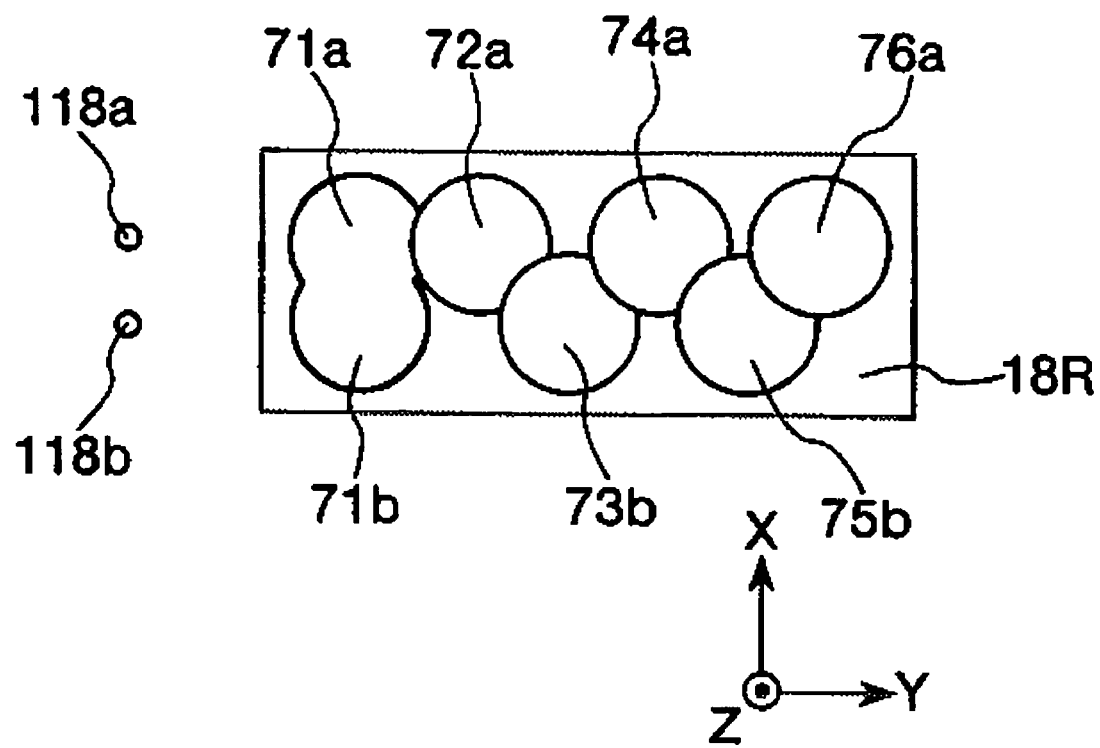
FIG. 10 is a drawing for explaining a droplet supplying method in a third embodiment of the present invention.

FIG. 10 is a drawing for explaining a droplet supplying method in a third embodiment of the present invention. Hereinafter, an explanation will be given for the method of supplying droplets onto a base of the second embodiment with reference to FIG. 10; however, differences between the first or second embodiment described above and the third embodiment are chiefly described, and the description of the similar portions is omitted.

In the third embodiment shown in FIG. 10, two first droplets 71a, 71b are ejected onto one partition 18R through two nozzles 118a, 118b at a time. One subsequent droplet is then ejected onto the one partition 18R through one of the nozzles 118a, 118b five times alternatively. Namely, subsequent droplets include first subsequent droplet 72a ejected through the nozzle 118a, second subsequent droplet 73b through the nozzle 118b, third subsequent droplet 74a through the nozzle 118a, fourth subsequent droplet 65b through the nozzle 118b, and fifth subsequent droplet 76a through the nozzle 118a. The amount of each of the subsequent droplets 72a, 73b, 74a, 75b, and 76a is adjusted so as to be the same as the amount of each of the first droplets 71a, 71b.

In this way, in the third embodiment, the first droplets are ejected onto one partition through a plurality of nozzles at a time, and the subsequent droplet or droplets is or are then ejected onto the one partition through one or some nozzle(s) less than the plurality of nozzles. Therefore, the amount of each of the subsequent droplets may be set to be the same as that of each of the first droplets.

Further, in the similar manner to the first or second embodiment described above, the first and subsequent droplets are supplied onto the one partition 18R so that these dots partially overlap with each other by a predetermined space. According to the method of supplying droplets onto the base in the third embodiment, it is possible to obtain the effects similar to those in the first embodiment described above.

Second Embodiment of Droplet Ejection Apparatus

Figure 11:
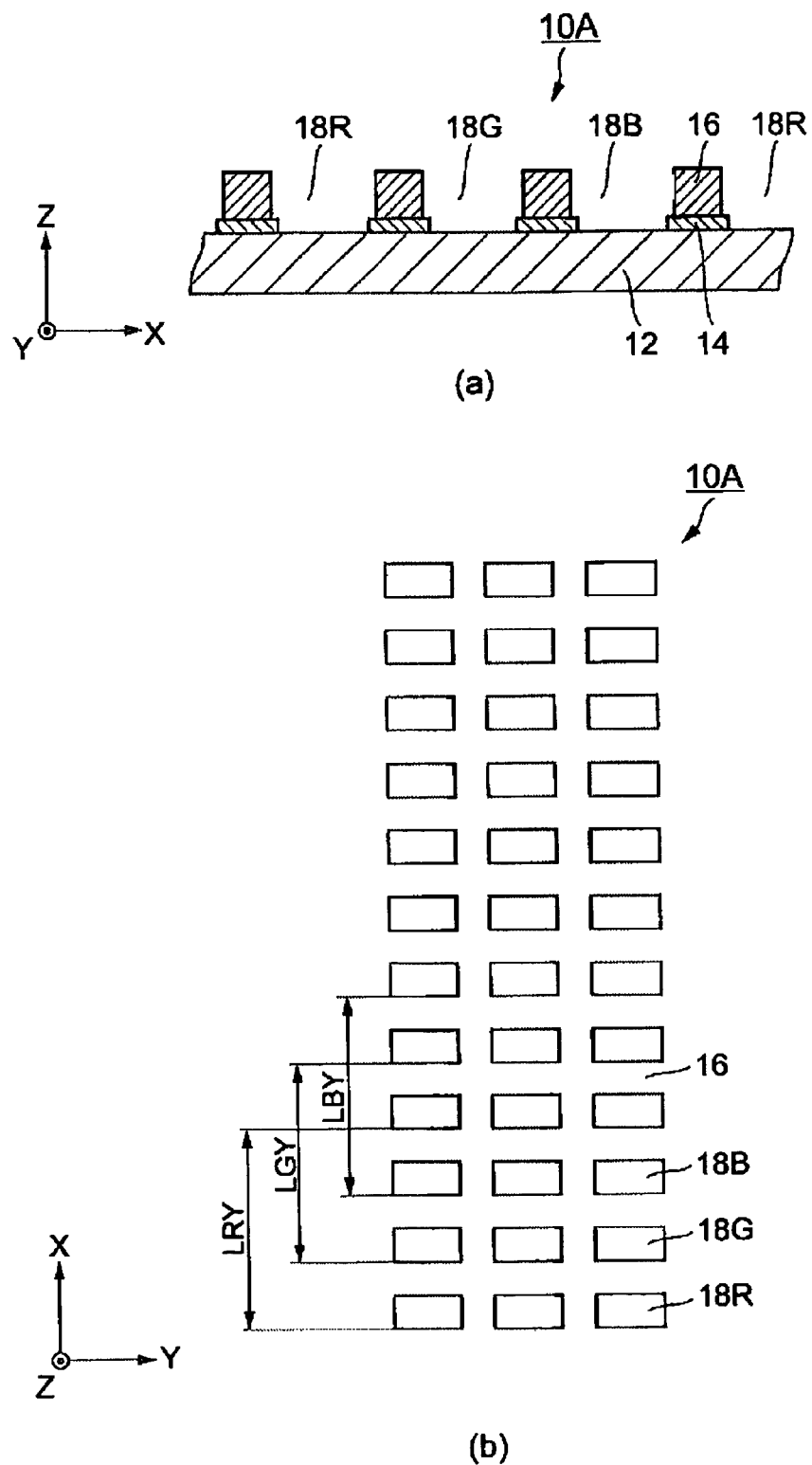
FIG. 11 is a schematic view which shows a base onto which a droplet is supplied by a droplet ejection apparatus in the second embodiment of the present invention.

Next, an example in which a droplet ejection apparatus of the present invention is applied to manufacturing of a color filter substrate will now be described in detail. FIG. 11 is a schematic view which shows a base 10A onto which a droplet is supplied by a droplet ejection apparatus 100 in the second embodiment of the present invention.

A base 10A shown in FIGS. 11(a) and 11(b) is a substrate to become a color filter substrate 10 by carrying out processes by a manufacturing apparatus 1 described later (see FIG. 12). The base 10A has a plurality of partitions 18R, 18G and 18B arranged thereon in a matrix manner.

More specifically, the base 10A includes a supporting substrate 12 having light permeability, and a plurality of elongated partitions 18R, 18G and 18B each becoming a color element (pixel region) formed on the supporting substrate 12 so as to be separated with black matrices 14 and banks 16. The black matrices 14 are formed from a material having light shielding effect. The black matrices 14 and the banks 16 provided on the black matrices 14 are positioned on the supporting substrate 12 in a matrix manner so that a plurality of light permeating portions, that is, a plurality of pixel regions are defined by them.

In the pixel regions, concave portions defined by the supporting substrate 12, the black matrices 14 and the banks 16 correspond to partitions 18R, 18G and 18B, respectively. The partition 18R is a region in which a filter layer 111FR into which only light having any wavelength within a red wavelength region permeates is to be formed. The partition 18G is a region in which a filter layer 111FG into which only light having any wavelength within a green wavelength region permeates is to be formed. The partition 18B is a region in which a filter layer 111FB into which only light having any wavelength within a blue wavelength region permeates is to be formed.

The base 10A shown in FIG. 11(b) is positioned on a virtual plane parallel to both an X axis direction and a Y axis direction. The partitions 18R, 18G and 18B in the base 10A are periodically arranged in this order in the X axis direction. On the other hand, the partitions 18R are aligned with a predetermined interval in the Y axis direction, the partitions 18G are aligned with a predetermined interval in the Y axis direction, and partitions 18B are aligned with a predetermined interval in the Y axis direction. In this regard, the X axis direction is perpendicular to the Y axis direction.

An interval LRY along the X axis direction for the partitions 18R, that is, a pitch is about 560 μm. This interval LRY is the same as an interval LGY along the X axis direction for the partitions 18G. Further, the partition 18R has a rectangular shape having long sides and short sides. More specifically, the length of the partition 18R in the X axis direction, that is, the length of the short side thereof is substantially 100 μm, and the length in the Y axis direction, that is, the length of the long side thereof is substantially 300 μm. Each of the partitions 18G and 18B has the same shape and size as those of the partition 18R. In this regard, the size of the interval between the adjacent partitions and the partition corresponds to the interval and size of pixels for same color in a high vision television having a screen size of about 40 inches.

Figure 12:
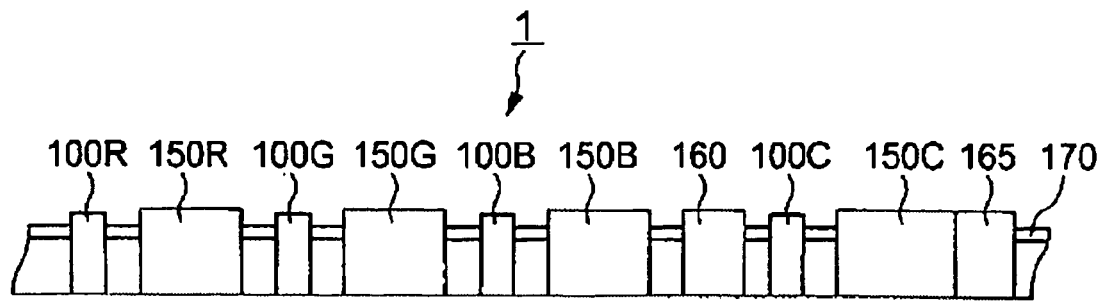
FIG. 12 is a schematic view which shows a manufacturing apparatus provided with the droplet ejection apparatus in the second embodiment of the present invention.

FIG. 12 is a schematic view which shows a manufacturing apparatus 1 provided with the droplet ejection apparatus 100 in the second embodiment of the present invention. The manufacturing apparatus 1 shown in FIG. 12 is an apparatus for supplying corresponding color filter materials onto each of the partitions 18R, 18G and 18B in the base 10A shown in FIG. 11. More specifically, the manufacturing apparatus 1 includes: a droplet ejection apparatus 100R for supplying a color filter material 111R onto all the partitions 18R using the method of supplying droplets onto a base described above; a drying apparatus 150R for drying the color filter material 111R supplied on the partitions 18R; a droplet ejection apparatus 100G for supplying a color filter material 111G onto all the partitions 18G using the method of supplying droplets onto a base described above; a drying apparatus 150G for drying the color filter material 111G supplied on the partitions 18G; a droplet ejection apparatus 100B for supplying a color filter material 111B onto all the partitions 18B using the method of supplying droplets onto a base described above; a drying apparatus 150B for drying the color filter material 111B supplied on the partitions 18B; an oven 160 for reheating (post-baking) the color filter materials 111R, 111G and 111B; a droplet ejection apparatus 100C for providing a protective film 20 on the color filter materials 111R, 111G and 111B thus post-baked; a drying apparatus 150C for drying the protective film 20; and a hardening apparatus 165 for hardening the dried protective film 20 by reheating. Further, the manufacturing apparatus 1 includes a transporting apparatus 170 for transporting the base 10A in the order from the droplet ejection apparatus 100R, the drying apparatus 150R, the droplet ejection apparatus 100G, the drying apparatus 150G, the droplet ejection apparatus 100B, the drying apparatus 150B, the droplet ejection apparatus 100C, the drying apparatus 150C, and the hardening apparatus 165.

Figure 13:
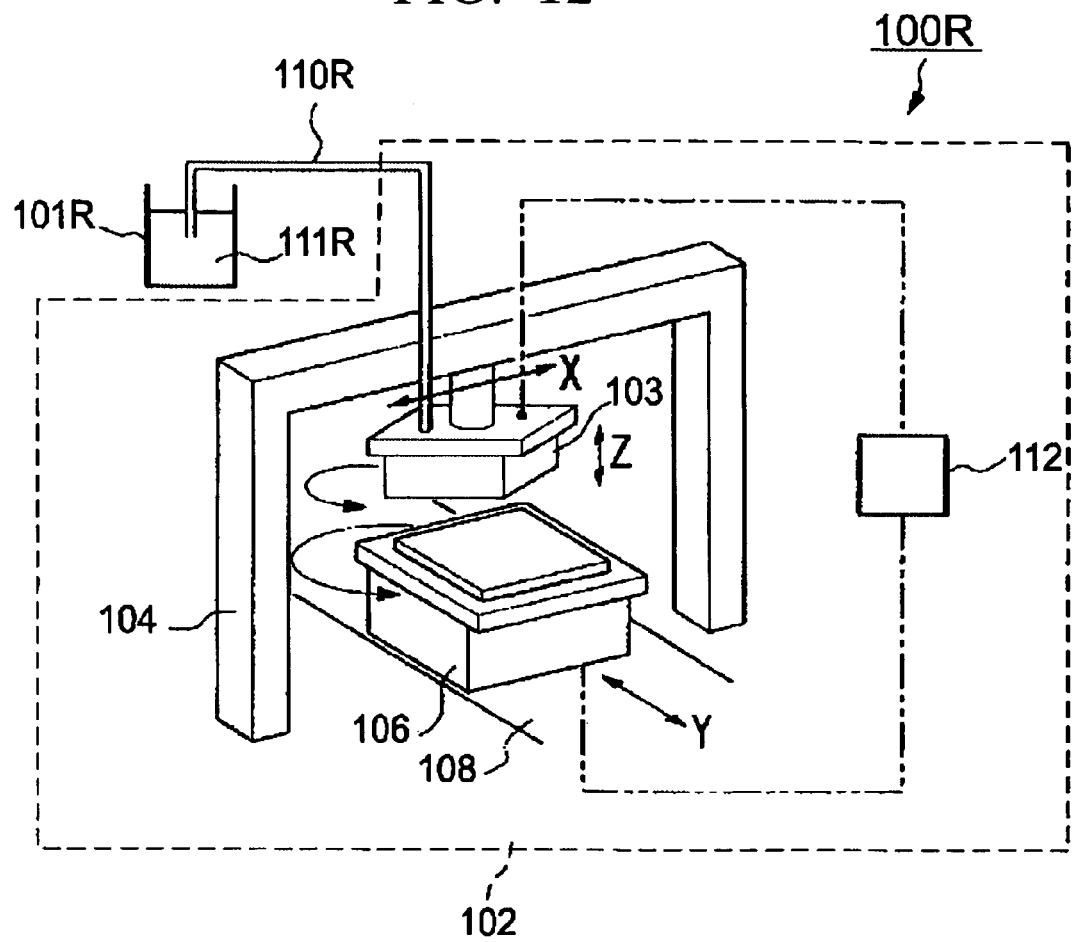
FIG. 13 is a perspective view of the droplet ejection apparatus in the second embodiment of the present invention.

FIG. 13 is a perspective view of the droplet ejection apparatus 100R in the second embodiment of the present invention. As shown in FIG. 13, the configuration of the droplet ejection apparatus 100R is substantially the same as that of the droplet ejection apparatus 100R in the first embodiment except that the droplet ejection apparatus 100R in the second embodiment includes a tank 101R for a liquid color filter material 111R and a tube 110R in place of the tank 101 and the tube 110. In this regard, the components (parts) of the droplet ejection apparatus 100R having similar functions to those of the droplet ejection apparatus 100 in the first embodiment are designated as the same reference numerals, and repeated explanations will be omitted.

Similarly, the configuration of the droplet ejection apparatus 100G, the configuration of the droplet ejection apparatus 100B, and the configuration of the droplet ejection apparatus 100C are substantially the same as that of the droplet ejection apparatus 100 in the first embodiment except that the droplet ejection apparatus 100G, 100B and 100C in the second embodiment respectively includes a tank 101G, 101B and 101C for a liquid color filter material 111G, 111B and 111C and a tube 110G, 110B and 110C in place of the tank 101 and the tube 110. In this regard, the color filter materials 111R, 111G and 111B of the present embodiment are some examples of the liquid material of the present invention.

Next, the operation of the droplet ejection apparatus 100R will be described. The droplet ejection apparatus 100R ejects a same liquid material onto a plurality of partitions 18R arranged in a matrix manner on the base 10A. In this regard, as will be described in a third embodiment, the base 10A may be replaced with a substrate for an electro-luminescence display, or a back substrate for a plasma display. Alternatively, the base 10A may be replaced with a substrate for image display provided with an electron emitting elements.

In the following explanation, a series of processes to manufacture a color filter substrate 10 using the manufacturing apparatus 1 will be described.

A base 10A shown in FIG. 11 is manufactured in accordance with the following steps. First, a metallic thin film is formed on a supporting substrate 12 by means of a spattering method or an evaporation method. Black matrices 14 are then formed in a reticular pattern from the metallic thin film by means of a photolithography method. Metal chromium and chromium oxide may be mentioned as materials for the black matrices 14. In this regard, the supporting substrate 12 is a substrate having light permeability with respect to visible light (optical wavelength), such as a glass substrate. Subsequently, a resist layer constituted from negative type photopolymer composition is applied so as to cover the supporting substrate 12 and the black matrices 14. The resist layer is exposed while making a mask film formed in a matrix pattern stick on the resist layer. Then, banks 16 are obtained by removing the non-exposed portions of the resist layer by an etching process. In this way, the base 10A is obtained.

Banks formed from a resin black is utilized in place of the banks 16. In this case, no metallic thin film (that is, black matrices 14) is required, and the bank layer is constructed from one layer.

Next, the base 10A is made lyophilic by means of oxygen plasma process under atmospheric pressure. The surface of the supporting substrate 12, the surface of the black matrices 14, and the surface of the banks 16 in the concave portions (a part of the pixel region), each of which is defined by the supporting substrate 12, the black matrices 14 and the banks 16, tend to take on lyophilic by this process. Further, a plasma process using $CF_4$ as a process gas is then carried out to the base 10A. By the plasma process using $CF_4$, the surface of the banks 16 in each of the concave portions is fluorinated, and the surface of the banks 16 tends to take on non-lyophilic by this process. In this regard, by the plasma process using $CF_4$, the surface of the supporting substrate 12 and the surface of the black matrices 14 that have taken on lyophilic lose lyophilic slightly. However, even so, these surfaces can maintain lyophilic. In this way, predetermined surface treatment is subjected to the surface of each of the concave portions each defined by the supporting substrate 12, the black matrices 14 and the banks 16, whereby the surface of each of the concave portions becomes any one of the partitions 18R, 18G and 18B.

In this regard, in accordance with the material of the supporting substrate 12, the material of the black matrices 14, and the material of the banks 16, the surface of each of the concave portions may take on desired lyophilic and non-lyophilic without the surface treatment described above. In such a case, it is no need for the surface to be subjected to the surface treatment described above. The surface of each of the concave portions defined by the supporting substrate 12, the black matrices 14 and the banks 16 becomes the partition 18R, 18G or 18B as it is.

Figure 14:
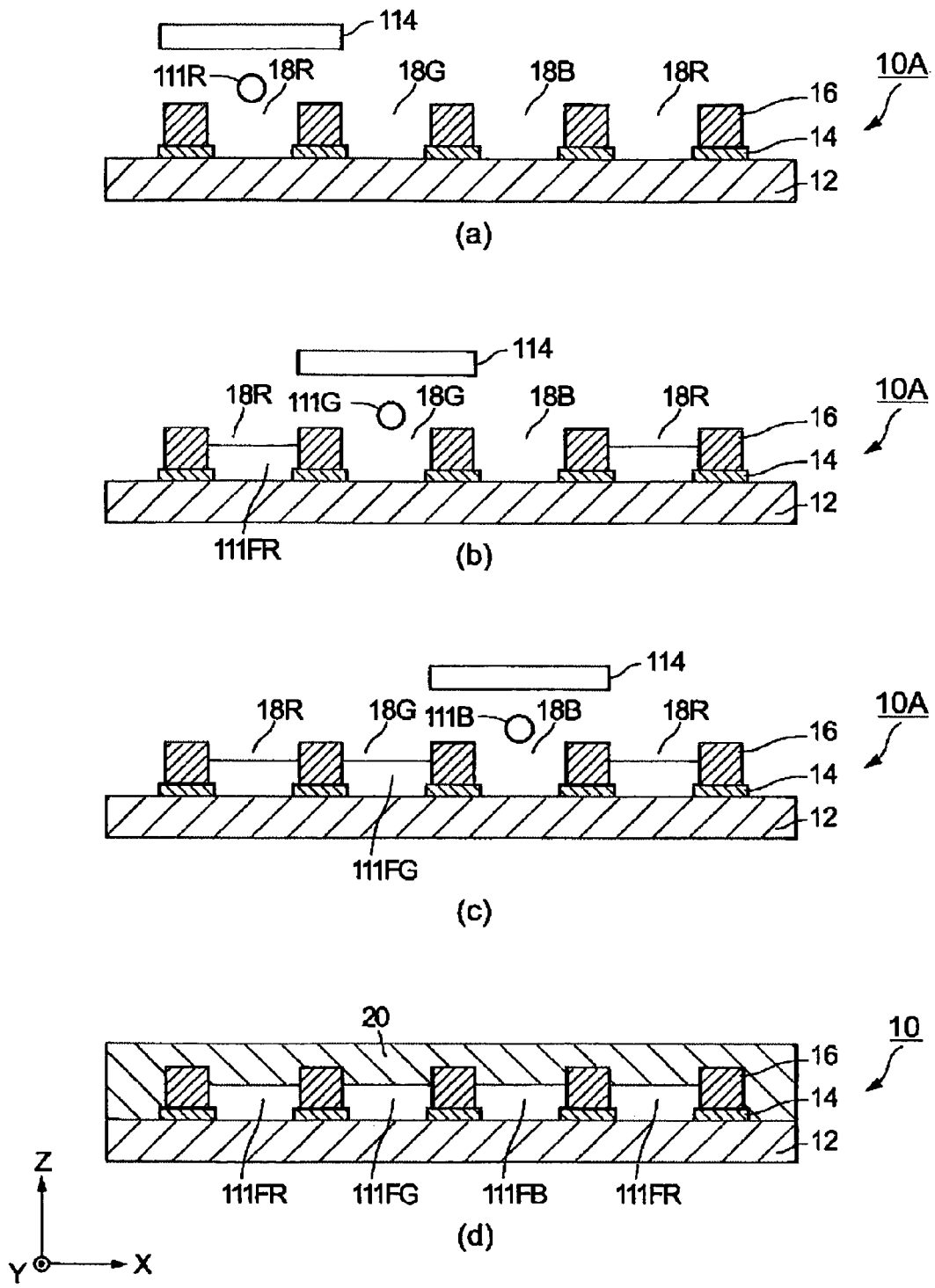
FIG. 14 is a schematic view which shows a method of supplying a liquid material on a base by means of the droplet ejection apparatus in the second embodiment of the present invention.

The base 10A on which the plurality of partitions 18R, 18G and 18B are formed is transported to the stage 106 of the droplet ejection apparatus 100R by the transporting apparatus 170. As shown in FIG. 14(a), in the droplet ejection apparatus 100R, the color filter material 111R is then ejected onto all of the partitions 18R through the droplet ejection heads 114 so that a layer of the color filter material 111R is formed on each of all the partitions 18R. More specifically, the droplet ejection apparatus 100R supplies the color filter material 111R onto the partitions 18R using the method of supplying droplets onto a base described above. In the case where the layer of the color filter material 111R is formed on each of all the partitions 18R of the base 10A, the transporting apparatus 170 transports the base 10A into the drying apparatus 150R. Then, by subjecting the color filter material 111R provided on the partitions 18R to complete drying, a filter layer 111FR is obtained on each of the partitions 18R.

Next, the transporting apparatus 170 transports the base 10A onto the stage 106 of the droplet ejection apparatus 100G. As shown in FIG. 14(b), in the droplet ejection apparatus 100G, the color filter material 111G is then ejected onto all of the partitions 18G through the droplet ejection heads 114 so that a layer of the color filter material 111G is formed on each of all the partitions 18G. More specifically, the droplet ejection apparatus 100G supplies the color filter material 111G onto the partitions 18G using the method of supplying droplets onto a base described above. In the case where the layer of the color filter material 111G is formed on each of all the partitions 18G of the base 10A, the transporting apparatus 170 transports the base 10A into the drying apparatus 150G. Then, by subjecting the color filter material 111G provided on the partitions 18G to complete drying, a filter layer 111FG is obtained on each of the partitions 18G.

Next, the transporting apparatus 170 transports the base 10A onto the stage 106 of the droplet ejection apparatus 100B. As shown in FIG. 14(c), in the droplet ejection apparatus 100B, the color filter material 111B is then ejected onto all of the partitions 18B through the droplet ejection heads 114 so that a layer of the color filter material 111B is formed on each of all the partitions 18B. More specifically, the droplet ejection apparatus 100B supplies the color filter material 111B onto the partitions 18B using the method of supplying droplets onto a base described above. In the case where the layer of the color filter material 111B is formed on each of all the partitions 18B of the base 10A, the transporting apparatus 170 transports the base 10A into the drying apparatus 150B. Then, by subjecting the color filter material 111B provided on the partitions 18B to complete drying, a filter layer 111FB is obtained on each of the partitions 18B.

Next, the transporting apparatus 170 transports the base 10A into the oven 160. The oven 160 then post-bakes (that is, reheats) the filter layers 111FR, 111FG and 111FB.

Next, the transporting apparatus 170 transports the base 10A onto the stage 106 of the droplet ejection apparatus 100C. In the droplet ejection apparatus 100C, the liquid protective material is then ejected onto the base 10A through the droplet ejection heads 114 so that a layer of the liquid protective material, that is, a protective film 20 is formed over the filter layers 111FR, 111FG, 111FB and the banks 16. After the protective film 20 has been formed over the filter layers 111FR, 111FG, 111FB and the banks 16, the transporting apparatus 170 transports the base 10A into the drying apparatus 150C. Then, the hardening apparatus 165 heats the protective film 20 to completely harden it after the drying apparatus 150 dries the protective film 20 completely, by which the base 10A becomes a color filter substrate 10.

Third Embodiment of Droplet Ejection Apparatus

Figure 15:
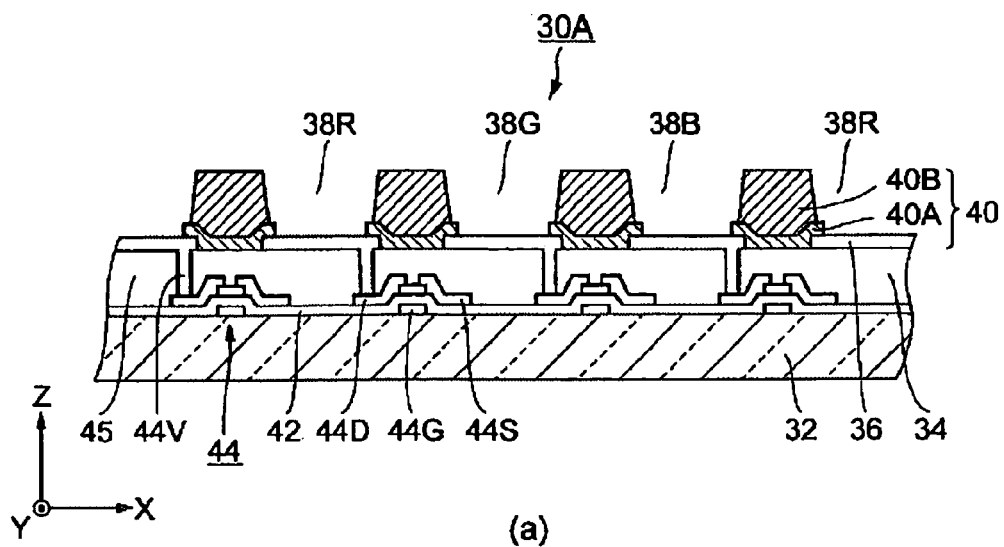
FIG. 15 is a schematic view which shows a base onto which a droplet ejection apparatus in a third embodiment of the present invention supplies droplets.
Figure 15:
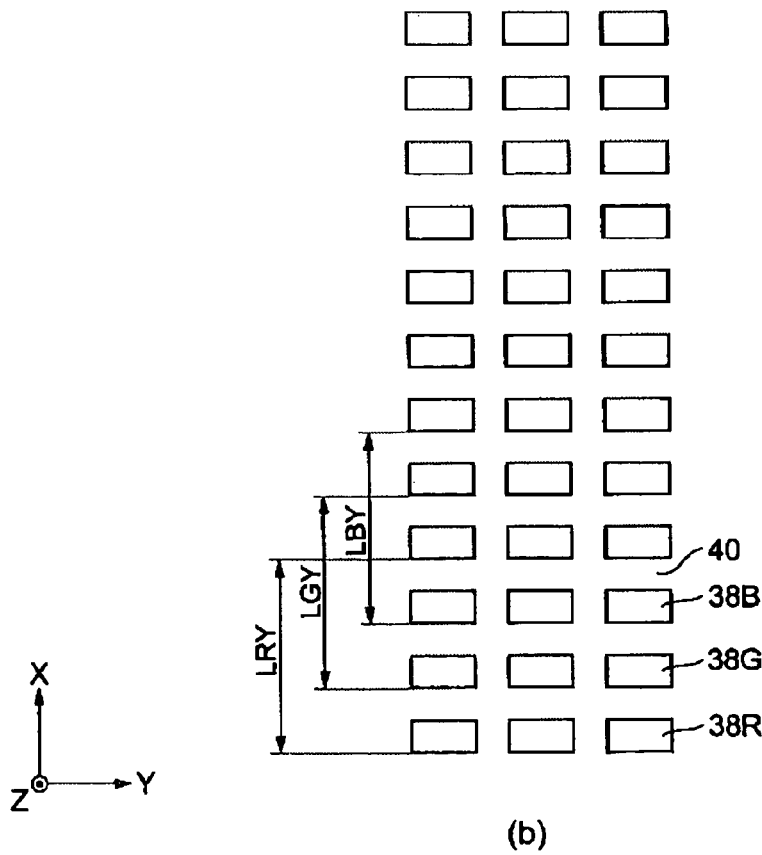

Next, an example in which a droplet ejection apparatus of the present invention is applied to a manufacturing apparatus of an electro-luminescence display will be described. FIG. 15 is a schematic view which shows a base 30A onto which a droplet ejection apparatus 200 in a third embodiment of the present invention supplies droplets.

A base 30A shown in FIGS. 15(a) and 15(b) is a substrate to become an electro-luminescence display 30 by carrying out processes by a manufacturing apparatus 2 described later (see FIG. 16). The base 30A has a plurality of partitions 38R, 38G and 38B arranged thereon in a matrix manner.

More specifically, the base 30A includes a supporting substrate 32, a circuit element layer 34 formed on the supporting substrate 32, a plurality of pixel electrodes 36 formed on the circuit element layer 34, and a plurality of banks 40 formed between the adjacent two of the plurality of pixel electrodes 36. The supporting substrate 12 has light permeability with respect to visible light (optical wavelength), such as a glass substrate. Each of the plurality of pixel electrodes 36 also has light permeability with respect to visible light (optical wavelength), such as an ITO (Indium-Tin Oxide) electrode. Further, the plurality of pixel electrodes 36 are arranged on the circuit element layer 34 in a matrix manner, and each of the pixel electrodes 36 defines a pixel region. Each of the banks 40 has a lattice-like structure, and each of the plurality of pixel electrodes 36 is surrounded with predetermined banks 40. Moreover, the banks 40 are constituted from inorganic banks 40A formed on the circuit element layer 34, and organic banks 40B positioned on the inorganic banks 40A.

The circuit element layer 34 is a layer provided with: a plurality of scanning electrodes each extending toward a predetermined direction on the supporting substrate 32; an insulating film 42 formed so as to cover the plurality of scanning electrodes; a plurality of signal electrodes provided on the insulating film 42 and each extending toward a direction perpendicular to the predetermined direction toward which each of the plurality of scanning electrodes extends; a plurality of switching elements 44 provided in the vicinity of intersection point between the scanning electrode and the signal electrode; and a plurality of interlayer insulating films 45 formed so as to cover the plurality of switching elements 44 such as polyimide. A gate electrode 44G and a source electrode 44S of each of the switching elements 44 is electrically connected to the corresponding scanning electrode and the corresponding signal electrode, respectively. The plurality of pixel electrodes 36 are positioned on the interlayer insulating film 45. A plurality of through-holes 44V are provided at portions corresponding to drain electrodes 44D of the switching elements 44, and the switching element 44 is electrically connected to the corresponding pixel electrodes 36 via the through-holes 44V, respectively. Further, the switching elements 44 are provided at the positions corresponding to the banks 44, respectively. In other words, when viewed from the direction perpendicular to the paper on which FIG. 15(b) is shown, each of the plurality of switching elements 44 is positioned so as to be covered with the corresponding bank 40.

Concave portions (a part of the pixel region) each defined by the pixel electrode 36 and the corresponding bank 40 correspond to partitions 38R, 38G and 38B, respectively. The partition 38R is a region in which a luminous layer 211FR emitting light having a wavelength within a red wavelength region is to be formed. The partition 38G is a region in which a luminous layer 211FG emitting light having a wavelength within a green wavelength region is to be formed. The partition 38B is a region in which a luminous layer 211FR emitting light having a wavelength within a blue wavelength region is to be formed.

The base 30A shown in FIG. 15(b) is positioned on a virtual plane parallel to both an X axis direction and a Y axis direction. The partitions 38R, 38G and 38B in the base 30A are periodically arranged in this order in the X axis direction. On the other hand, the partitions 38R are aligned with a predetermined interval in the Y axis direction, the partitions 38G are aligned with a predetermined interval in the Y axis direction, and partitions 38B are aligned with a predetermined interval in the Y axis direction. In this regard, the X axis direction is perpendicular to the Y axis direction.

An interval LRY along the X axis direction for the partitions 38R, that is, a pitch is about 560 µm. This interval LRY is the same as an interval LGY along the X axis direction for the partitions 38G. Further, the partition 38R has a rectangular shape having long sides and short sides. More specifically, the length of the partition 38R in the X axis direction, that is, the length of the short side thereof is substantially 100 µm, and the length in the Y axis direction, that is, the length of the long side thereof is substantially 300 µm. Each of the partitions 38G and 38B also has the same shape and size as those of the partition 38R. In this regard, the size of the interval between the adjacent partitions and the partition corresponds to the interval and size of pixels for same color in a high vision television having a screen size of about 40 inches.

Figure 16:
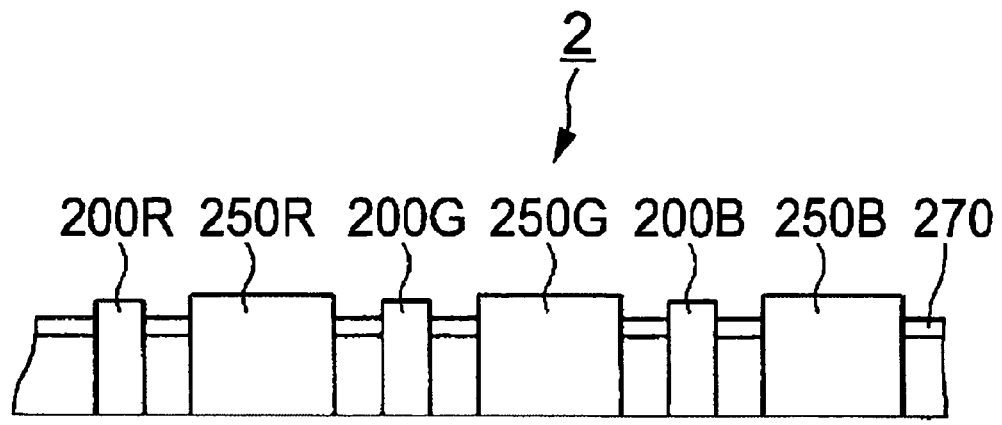
FIG. 16 is a schematic view which shows a manufacturing apparatus provided with the droplet ejection apparatus in the third embodiment of the present invention.

FIG. 16 is a schematic view which shows a manufacturing apparatus 2 provided with the droplet ejection apparatuses 200R, 200G and 200B in the third embodiment of the present invention. The manufacturing apparatus 2 shown in FIG. 16 is an apparatus for supplying corresponding luminous materials onto each of the partitions 38R, 38G and 38B in the base 30A shown in FIG. 15. The manufacturing apparatus 2 includes: a droplet ejection apparatus 200R for supplying a luminous material 211R onto all the partitions 38R using the method of supplying droplets onto a base described above; a drying apparatus 250R for drying the luminous material 211R supplied on the partitions 38R; a droplet ejection apparatus 200G for supplying a luminous material 211G onto all the partitions 38G using the method of supplying droplets onto a base described above; a drying apparatus 250G for drying the luminous material 211G supplied on the partitions 38G; a droplet ejection apparatus 200B for supplying a luminous material 211B onto all the partitions 38B using the method of supplying droplets onto a base described above; and a drying apparatus 250B for drying the luminous material 211B supplied on the partitions 38B. Further, the manufacturing apparatus 2 includes a transporting apparatus 270 for transporting the base 30A in the order from the droplet ejection apparatus 200R, the drying apparatus 250R, the droplet ejection apparatus 200G, the drying apparatus 250G, the droplet ejection apparatus 200B, and the drying apparatus 250B.

Figure 17:
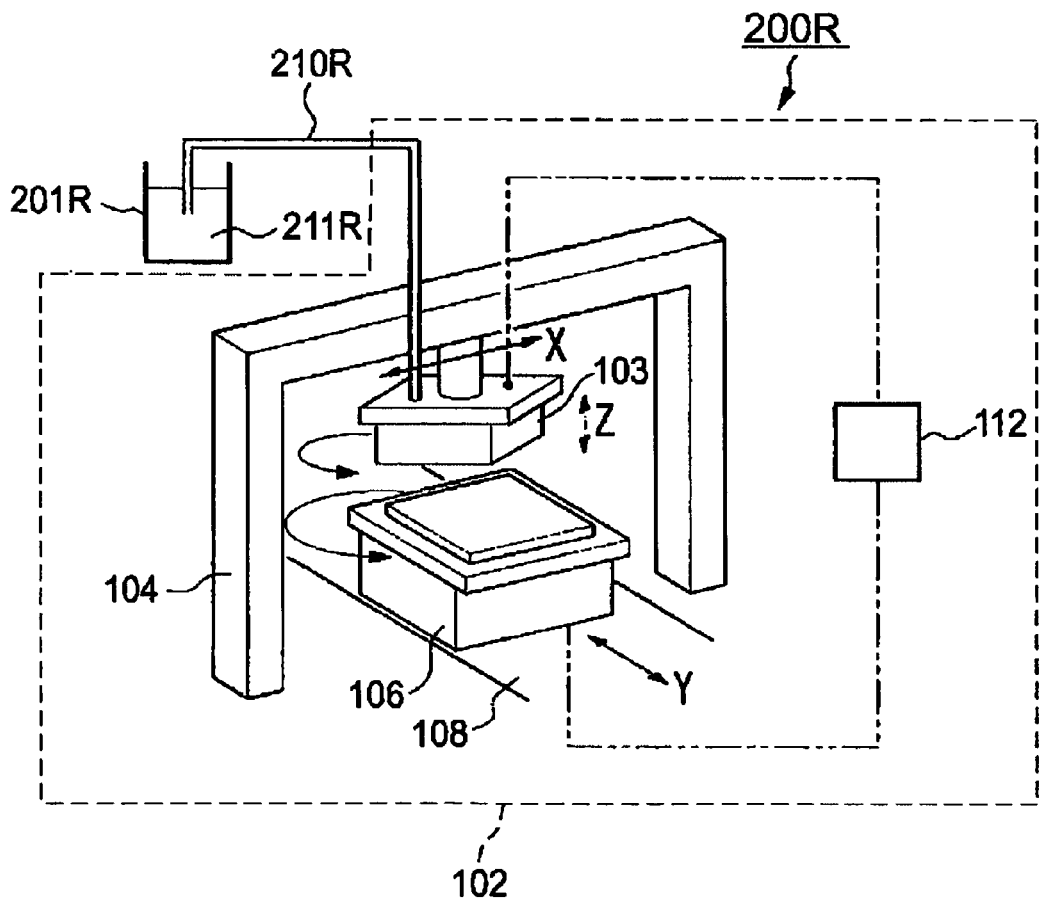
FIG. 17 is a perspective view of the droplet ejection apparatus in the third embodiment of the present invention.

FIG. 17 is a perspective view of the droplet ejection apparatus 200R in the third embodiment of the present invention. The droplet ejection apparatus 200R shown in FIG. 17 includes a tank 201R for storing a liquid luminous material 211R, a tube 210R, and an ejection scanning unit 102 in which the liquid luminous material 211R is supplied from the tank 201R via the tube 210R. Since the structure of the ejection scanning unit 102 is the same as the structure of the ejection scanning unit 102 in the first embodiment (see FIG. 1), the components (parts) of the ejection scanning unit 102 having similar functions to those of the ejection scanning unit 102 in the first embodiment are designated as the same reference numerals, and repeated explanations will be omitted. Further, the configuration of the droplet ejection apparatus 200G and the configuration of the droplet ejection apparatus 200B are substantially the same as that of the droplet ejection apparatus 200R except that the droplet ejection apparatus 200G and 200B respectively includes a tank 201G and 201B for a liquid luminous material 211G and 211B and a tube 2100G and 110B in place of the tank 201R and the tube 210R. In this regard, the luminous materials 211R, 211G and 211B of the present embodiment are some examples of the liquid material of the present invention.

Next, an explanation will be given for a method of manufacturing a electro-luminescence display 30 with the manufacturing apparatus 2. First, the base 30A shown in FIG. 15 is manufactured using a known film forming technology and patterning technology.

Next, the base 30A is made lyophilic by means of oxygen plasma process under atmospheric pressure. The surface of the pixel electrodes 36, the surface of the inorganic banks 40A and the surface of the organic banks 40B in the concave portions (a part of the pixel region), each of which is defined by the pixel electrodes 36 and the banks 40, tend to take on lyophilic by this process. Further, a plasma process using $CF_4$ as a process gas is then carried out to the base 30A. By the plasma process using $CF_4$, the surface of the organic banks 40B in each of the concave portions is fluorinated, and the surface of the organic banks 40B tends to take on non-lyophilic by this process. In this regard, by the plasma process using $CF_4$, the surface of the pixel electrodes 36 and the surface of the inorganic banks 40A that have taken on lyophilic lose lyophilic slightly. However, even so, these surfaces can maintain lyophilic. In this way, predetermined surface treatment is subjected to the surface of each of the concave portions each defined by the pixel electrodes 36, the inorganic banks 40A and the organic banks 40B, whereby the surface of each of the concave portions becomes any one of the partitions 38R, 38G and 38B.

In this regard, in accordance with the material of the pixel electrodes 36, the material of the inorganic banks 40A, and the material of the organic banks 40B, the surface of each of the concave portions may take on desired lyophilic and non-lyophilic without the surface treatment described above. In such a case, it is no need for the surface to be subjected to the surface treatment described above. The surface of each of the concave portions defined by the pixel electrodes 36, the inorganic banks 40A and the organic banks 40B becomes the partition 38R, 38G or 38B as it is.

In this regard, corresponding hole transport layers 37R, 37G and 37B may be formed on each of the plurality of pixel electrodes 36 thus subjected to the surface treatment. In the case where the hole transport layers 37R, 37G and 37B are respectively positioned between the pixel electrodes 36 and luminous layers 211FR, 211FG and 211FB, it is possible to improve luminous efficiency of the electro-luminescence display. In this case, the concave portions each defined by the hole transport layers 37R, 37G and 37B and the banks 40 correspond to partitions 38R, 38G and 38B.

In this regard, it is possible to form the hole transport layers 37R, 37G and 37B by means of an ink jet method. In this case, solutions each including material for forming each of the hole transport layers 37R, 37G and 37B may be applied to each of the pixel regions by a predetermined quantity, and the hole transport layers 37R, 37G and 37B may be formed by drying. It should be noted that the hole transport layers may be formed using a drawing method (that is, the method of supplying droplets onto a base according to the present invention).

Figure 18:
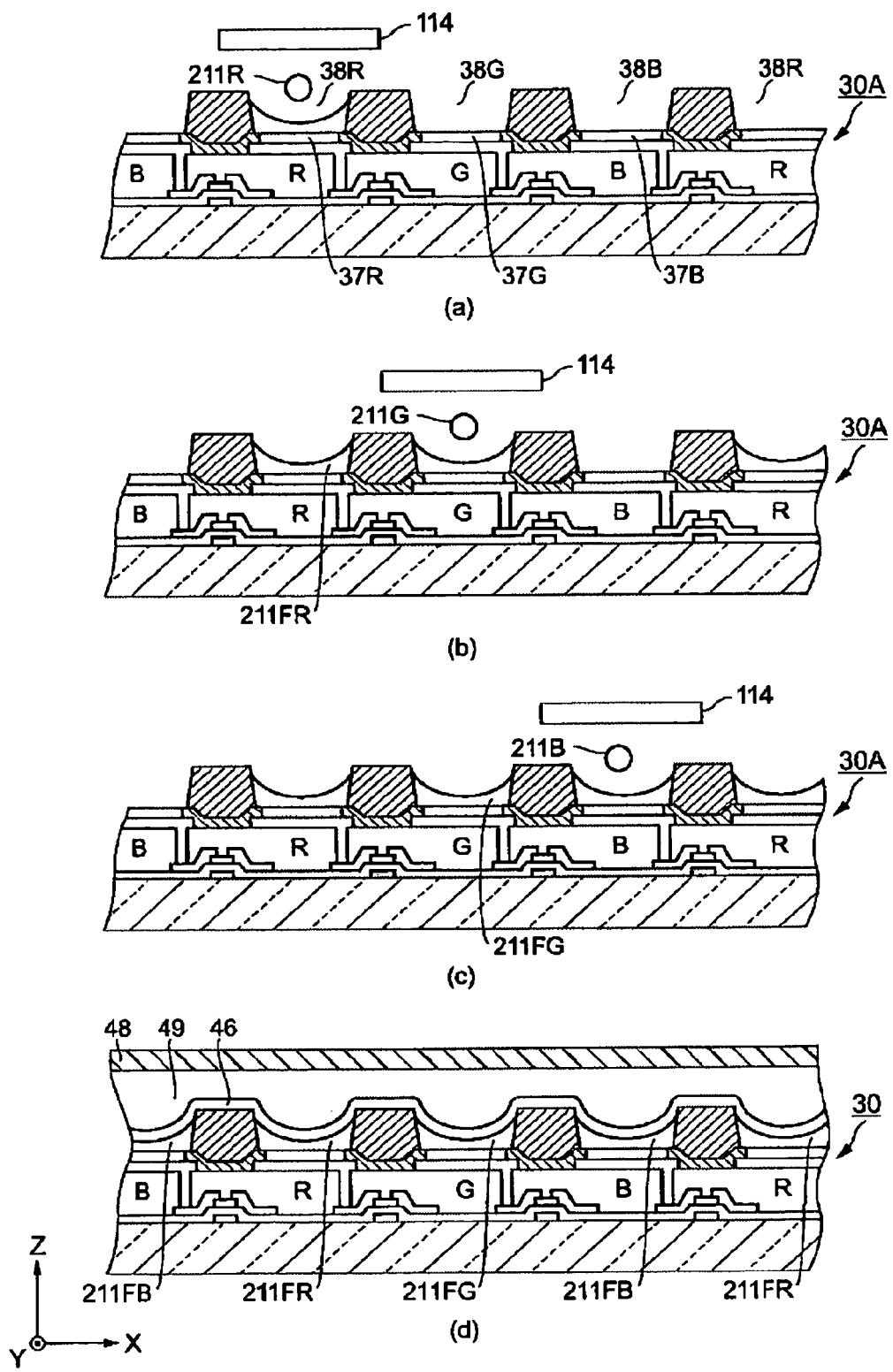
FIG. 18 is a schematic view which shows a method of supplying a liquid material on a base by means of the droplet ejection apparatus in the third embodiment of the present invention.

The base 30A on which the plurality of partitions 38R, 38G and 38B are formed is transported to the stage 106 of the droplet ejection apparatus 200R by the transporting apparatus 270. As shown in FIG. 18(a), in the droplet ejection apparatus 200R, the luminous material 211R is then ejected onto all of the partitions 38R through the droplet ejection heads 114 so that a layer of the luminous material 211R is formed on each of all the partitions 38R. More specifically, the droplet ejection apparatus 200R supplies the luminous material 211R onto the partitions 38R using the method of supplying droplets onto a base described above. In the case where the layer of the luminous material 211R is formed on each of all the partitions 38R of the base 30A, the transporting apparatus 270 transports the base 30A into the drying apparatus 250R. Then, by subjecting the luminous material 211R provided on the partitions 38R to complete drying, a luminous layer 211FR is obtained on each of the partitions 38R.

Next, the transporting apparatus 270 transports the base 30A onto the stage 106 of the droplet ejection apparatus 200G. As shown in FIG. 18(b), in the droplet ejection apparatus 200G, the luminous material 211G is then ejected onto all of the partitions 38G through the droplet ejection heads 114 so that a layer of the luminous material 211G is formed on each of all the partitions 38G. More specifically, the droplet ejection apparatus 200G supplies the luminous material 211G onto the partitions 38G using the method of supplying droplets onto a base described above. In the case where the layer of the luminous material 211G is formed on each of all the partitions 38G of the base 30A, the transporting apparatus 270 transports the base 30A into the drying apparatus 250G. Then, by subjecting the luminous material 211G provided on the partitions 38G to complete drying, a luminous layer 211FG is obtained on each of the partitions 38G.

Next, the transporting apparatus 270 transports the base 30A onto the stage 106 of the droplet ejection apparatus 200B. As shown in FIG. 18(c), in the droplet ejection apparatus 200B, the luminous material 211B is then ejected onto all of the partitions 38B through the droplet ejection heads 114 so that a layer of the luminous material 211B is formed on each of all the partitions 38B. More specifically, the droplet ejection apparatus 200B supplies the luminous material 211B onto the partitions 38B using the method of supplying droplets onto a base described above. In the case where the layer of the luminous material 211B is formed on each of all the partitions 38B of the base 30A, the transporting apparatus 270 transports the base 30A into the drying apparatus 250B. Then, by subjecting the luminous material 211B provided on the partitions 38B to complete drying, a luminous layer 211FB is obtained on each of the partitions 38B.

Next, as shown in FIG. 18(d), counter electrodes 46 are formed so as to cover the luminous layers 211FR, 211FG and 211FB and the banks 40. Each of the counter electrodes functions as a negative electrode. Subsequently, by joining a sealing substrate 48 to the base 30A with their peripheral portions, the electro-luminescence display 30 shown in FIG. 18(d) is obtained. In this regard, an inert gas is encapsulated between the sealing substrate 48 and the base 30A.

In the electro-luminescence display 30, light emitted from the luminous layer 211FR, 211FG and 211FB emits to outside through the pixel electrode 36, the circuit element layers 34 and the supporting substrate 32. An electro-luminescence display in which light is emitted through the circuit element layers 34 in this manner is called as a bottom emission type display.

The case where the present invention is applied to manufacturing of a liquid-crystal display (color filter substrate) and manufacturing of an electro-luminescence display have been described based on the embodiments shown in the drawings, but it should be noted that the present invention is not limited to the embodiment. For example, it is possible to apply the present invention to manufacturing of a back substrate of a plasma display, or an image display provided with electron emission elements (which is also referred to as a SED (Surface-Conduction Electron-Emitter Display) or a FED (Field Emission Display)).

Embodiment of Electronic Device

An image display (electro-optic apparatus) 1000 such as the liquid-crystal display, the electro-luminescence display, the plasma display or the image display provided with an electron emission elements (that is, electronic device of the present invention) manufactured using the method described above can be utilized as a display portion of each of various types of electronic apparatuses.

Figure 19:
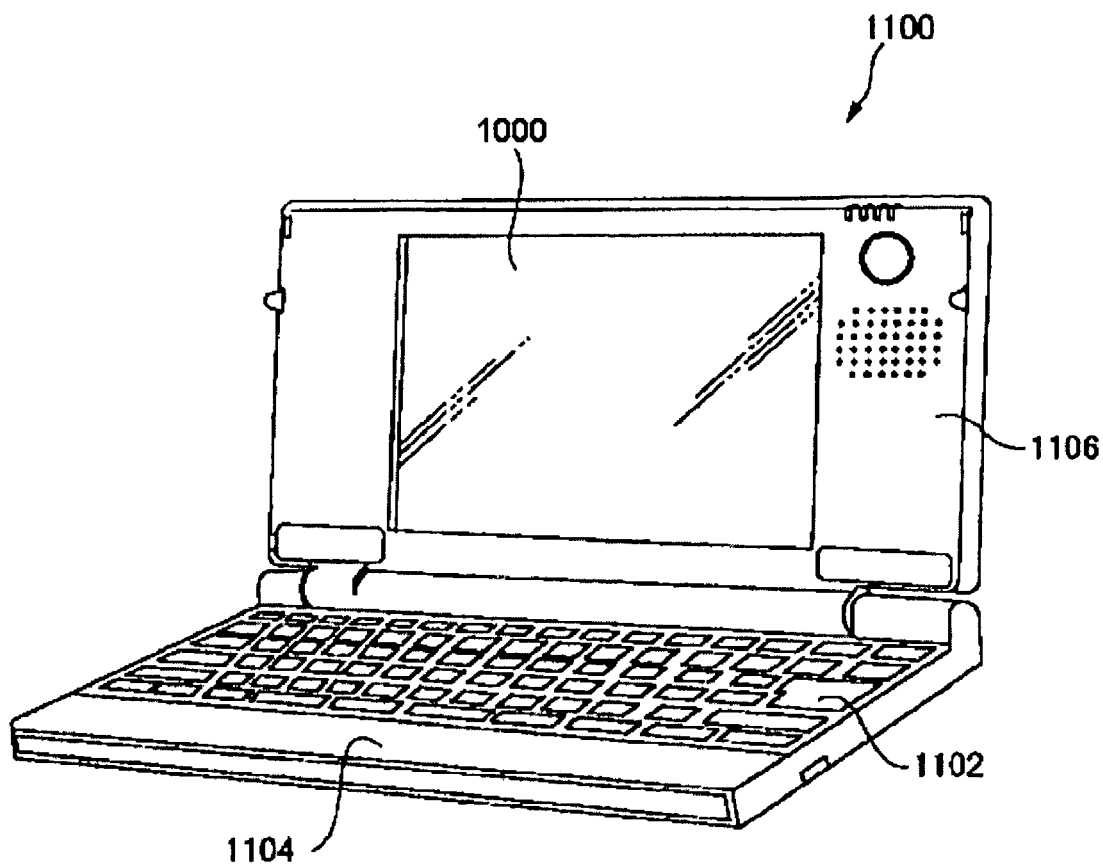
FIG. 19 is a perspective view which shows a structure of a mobile (or laptop type) personal computer to which an electronic apparatus of the present invention is applied.

FIG. 19 is a perspective view which shows a structure of a mobile (or laptop type) personal computer to which an electronic apparatus of the present invention is applied. Referring to FIG. 19, a personal computer 1100 is provided with a body 1104 having a keyboard 1102, and a display unit 1106. The display unit 1106 is rotatably supported on the body 1104 via a hinge portion. In this personal computer 1100, the display unit 1106 is provided with the image display (electro-optical device) 1000 described above.

Figure 20:
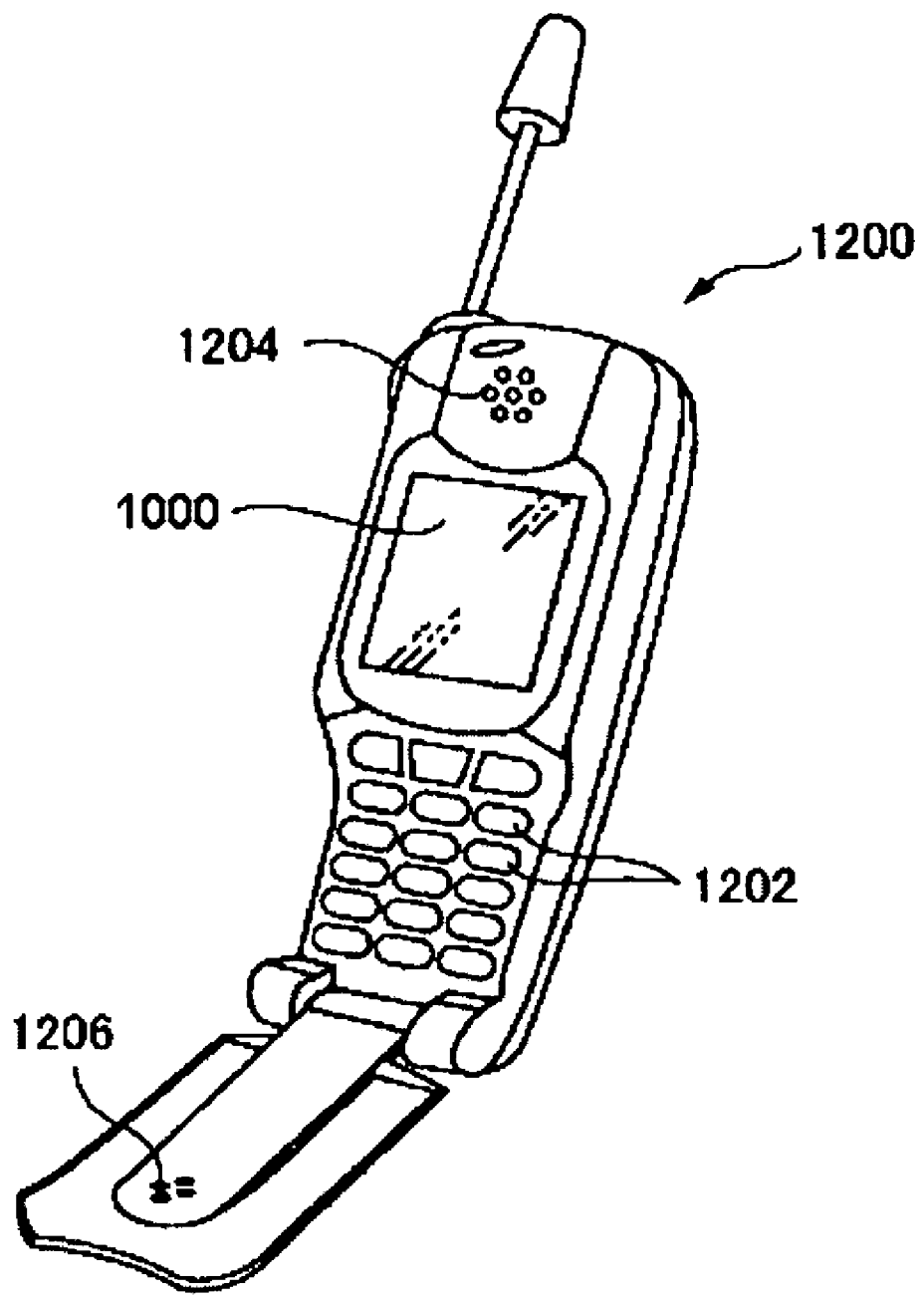
FIG. 20 is a perspective view which shows a structure of a portable phone (including a personal handy phone system) to which an electronic apparatus of the present invention is applied.

FIG. 20 is a perspective view which shows a structure of a portable phone (including a personal handy phone system) to which an electronic apparatus of the present invention is applied. Referring to FIG. 20, a portable phone 1200 is provided with a plurality of buttons 1202, an earpiece 1204, a mouthpiece 1206, and a display portion. The display portion is constituted from the image display (electro-optical device) 1000 described above.

Figure 21:
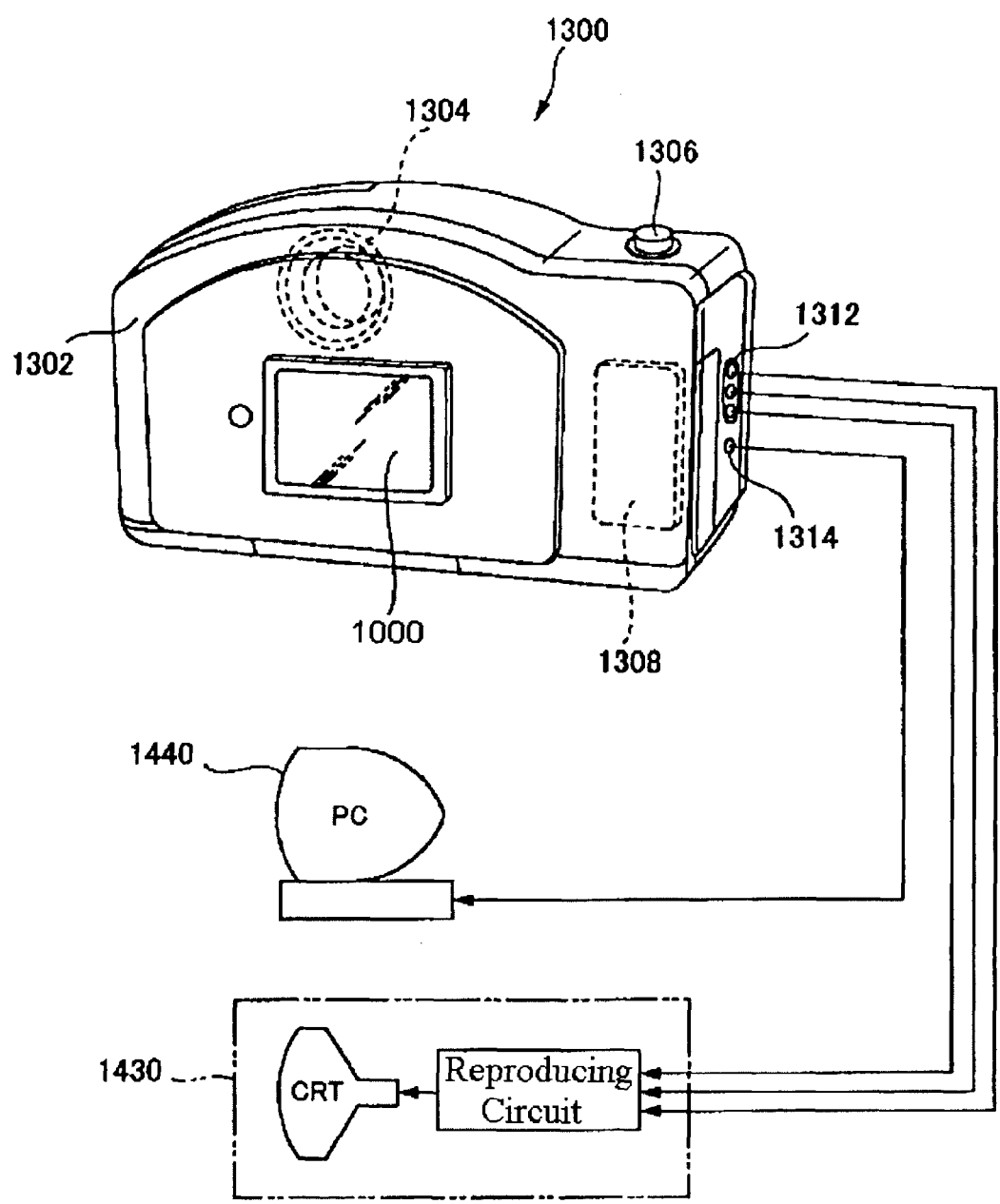
FIG. 21 is a perspective view which shows a structure of a digital still camera to which an electronic apparatus of the present invention is applied.

FIG. 21 is a perspective view which shows a structure of a digital still camera to which an electronic apparatus of the present invention is applied. In this drawing, connection of the digital still camera to external equipments thereof is schematically shown. A normal camera exposes a silver salt photographic film on the basis of an optical image of a subject, while the digital still camera 1300 generates an imaging signal (image signal) by photoelectrically converting an optical image of a subject into the imaging signal with imaging device such as a charge coupled device (CCD).

The image display 10000 described above is provided as a display portion on the back surface of a case (body) 1302 in the digital still camera 1300. The liquid crystal display 10 displays an image in response to an imaging signal by the CCD, and serves as a finder for displaying a subject as an electronic image. A circuit board 1308 is placed inside the case 1302. A memory capable of storing an imaging signal is placed on the circuit board 1308.

Further, a light receiving unit 1304 including an optical lens (imaging optical system), the CCD, and the like is provided in the front surface side of the case 1302. When a photographer confirms an image of a subject displayed on the display portion, and pushes a shutter button 1306, an imaging signal of the CCD at the time is transferred to the memory of the circuit board 1308 and stored in this memory.

Further, a video signal output terminal 1312 and a input/output terminal 1314 for data communication are provided on the side surface of the case 1302 in the digital still camera 1300. As shown in FIG. 8, a television monitor 1430 and a personal computer 1440 are respectively connected to the video signal output terminal 1312 and the input/output terminal 1314 for data communication if needed. Moreover, the imaging signal stored in the memory of the circuit board 1308 is outputted to the television monitor 1430 or the personal computer 1440 with a predetermined operation.

In this regard, the electronic apparatus of the present invention can be suitably used in (or applied to), for example, televisions, video cameras, view finder type or monitor direct view type videotape recorders, laptop type personal computers, car navigation devices, pagers, electronic notebooks (including those having communication functions), electronic dictionaries, pocket calculators, electronic game devices, word processors, work stations, television telephones, television monitors for crime prevention, electronic binoculars, POS (point-of-sale) terminals, apparatuses with touch panel (for example, cash dispensers in a financial institutions, automatic ticket vending machines), medical devices (electronic thermometers, blood pressure meters, blood sugar meters, electrocardiogram displaying devices, ultrasound diagnostic devices, displays for endoscopes, for example), fish finders, various measurement devices, gauges (gauges for vehicles, airplanes, ships and the like, for example), flight simulators, any other types of monitors, projection type displays such as projectors and the like, in addition to the personal computer (mobile personal computer) 1100 shown in FIG. 19, the portable phone 1200 shown in FIG. 20 and the digital still camera 1300 shown in FIG. 21.

The method of supplying a liquid material onto a base, the droplet ejection apparatus, the base with a plurality of color elements, the electro-optic apparatus and the electronic apparatus according to the present invention have been described based on the embodiment shown in the drawings, but it should be noted that the present invention is not limited to the embodiments. Respective portions of the droplet ejection apparatus, the electronic device, and the electronic apparatus can be replaced with an arbitrary arrangement capable of functioning in the same manner. Further, any other arbitrary component may be added to the droplet ejection apparatus, the electronic device, and the electronic apparatus of the present invention.

What is claimed is:

1. A method of supplying a liquid material for forming a color element in the form of droplets onto a base formed with a plurality of partitions using a droplet ejection device having a plurality of nozzles for ejecting the liquid material onto the partitions of the base, the liquid material being supplied onto the base while mutually moving the base with respect to the droplet ejection device, the method comprising:

ejecting the liquid material in the form of a plurality of droplets onto the partitions of the base successively through the plurality of nozzles of the droplet ejection device so that the respective droplets including a first droplet and at least one other subsequent droplet land on a partition of the plurality of partitions, wherein after the liquid material in the form of the first droplet is ejected through the nozzle, the liquid material in the form of the at least one other subsequent droplet is ejected through the same nozzle, wherein an amount of the liquid material constituting the at least one other subsequent droplet ejected from the plurality of nozzles is less than an amount of the liquid material constituting the first droplet ejected from the same nozzle as the nozzle that ejected the at least one other subsequent droplet, and a flying velocity of the at least one other subsequent droplet is set to be lower than a flying velocity of the first droplet, wherein the at least one other subsequent droplet is ejected onto the partition so that the at least one other subsequent droplet lands on the partition before the first droplet in a liquid state is dried.

2. The method as claimed in claim 1, wherein the liquid material is ejected onto the partition successively so that each of the droplets lands on the partition and partially overlaps on a previously landed droplet.

3. The method as claimed in claim 1, wherein the liquid material is ejected onto the partition from each of the nozzles so that the first and the at least one other subsequent droplet ejected from the nozzles land on the partition at the same time.

4. The method as claimed in claim 1, wherein the liquid material is ejected onto the partition from each of the nozzles so that the first droplet from each nozzle lands on the partition at the same time and the at least one other subsequent droplet ejected from the nozzles land on the partition at different times alternately.

5. The method as claimed in claim 1, wherein the amount of the liquid material constituting the at least one other subsequent droplet is set from 30% to 70% of the amount of the liquid material constituting the first droplet.

6. A base with a plurality of color elements manufactured using the method defined by claim 1.

7. An electro-optic apparatus comprising the base with a plurality of color elements defined by claim 6.

8. An electronic apparatus comprising the electro-optic apparatus defined by claim 7.

9. The method as claimed in claim 1, wherein the at least one other subsequent droplet includes four subsequent droplets, an amount of each of the four subsequent droplets is different from each other.

10. The method as claimed in claim 1, wherein the plurality of nozzles constitute a nozzle array and include a first nozzle and a second nozzle arranged adjacent to each other, and the liquid material constituting the droplets ejected through the first nozzle and the second nozzle is ejected onto the partitions of the base, wherein the liquid material constituting the first droplets ejected through the first and second nozzles is ejected through the first and second nozzles at a time, and then the liquid material constituting the at least one other subsequent droplets ejected through the first and second nozzles is ejected onto the partition through the first and second nozzles alternately in different timing.

11. The method as claimed in claim 10, wherein the first droplets ejected through the first and second nozzles at a time onto the partition are combined with each other in a liquid state.

12. The method as claimed in claim 1, wherein the plurality of partitions are concave portions.

* * * * *